US006665545B1

(12) United States Patent
Raleigh et al.

(10) Patent No.: US 6,665,545 B1
(45) Date of Patent: Dec. 16, 2003

(54) METHOD AND APPARATUS FOR ADAPTIVE TRANSMISSION BEAM FORMING IN A WIRELESS COMMUNICATION SYSTEM

(75) Inventors: Gregory Gene Raleigh, El Granada, CA (US); Suhas Nagraj Diggavi, Stanford, CA (US); Vincent Knowles Jones, IV, Redwood Shores, CA (US); Arogyaswami Joseph Paulraj, Stanford, CA (US)

(73) Assignees: The Board of Trustees of the Leland Stanford Jr. University, Stanford, CA (US); Cisco Technology Inc., San Jose, CA (US)

( * ) Notice: Subject to any disclaimer, the term of this patent is extended or adjusted under 35 U.S.C. 154(b) by 0 days.

(21) Appl. No.: 09/563,806

(22) Filed: May 2, 2000

Related U.S. Application Data

(63) Continuation of application No. 08/491,044, filed on Jun. 16, 1995, now Pat. No. 6,101,399, which is a continuation-in-part of application No. 08/394,652, filed on Feb. 22, 1995, now abandoned.

(51) Int. Cl.[7] .................................................. H04Q 7/30
(52) U.S. Cl. ..................... 455/562.1; 455/63.4; 455/273
(58) Field of Search ........................... 455/561.2, 517, 455/524, 525, 62.63, 65, 67.1, 562.1, 137, 273, 276.1, 63.4; 375/232; 342/367

(56) References Cited

U.S. PATENT DOCUMENTS

| 5,132,694 A | 7/1992 | Sreenivas | 342/373 |
| 5,260,968 A | 11/1993 | Gardner et al. | 375/1 |
| 5,274,844 A | 12/1993 | Harrison et al. | 455/25 |

(List continued on next page.)

FOREIGN PATENT DOCUMENTS

| EP | 0142293 A3 | 10/1984 | G01S/7/28 |
| EP | 0595247 A1 | 10/1993 | H01Q/3/26 |
| GB | 2266998 A | 11/1993 | H01Q/3/26 |
| WO | WO 94/09568 | 4/1994 | H04B/1/10 |
| WO | WO 95/34997 A | 12/1996 | |

OTHER PUBLICATIONS

Per Zetterberg, "The Spectrum Efficiency of a Basestation Antenna Array System for Spatially Selective Transmission," 1–24–94, pp. 1–37.
Per Zeterberg, Björn Ottersten, "Experiments Using an Antenna Array in a Mobile Communications Environment," 4–29–94, 5 pages.

(List continued on next page.)

*Primary Examiner*—Nay Maung
*Assistant Examiner*—Philip J. Sobutka
(74) *Attorney, Agent, or Firm*—Ritter, Lang & Kaplan LLP

(57) ABSTRACT

A method for forming an adaptive phased array transmission beam pattern at a base station without any knowledge of array geometry or mobile feedback is described. The approach is immune to the problems which plague methods which attempt to identify received angles of arrival from the mobile and map this information to an optimum transmit beam pattern. In addition, this approach does not suffer the capacity penalty and mobile handset complexity increase associated with mobile feedback. Estimates of the receive vector propagation channels are used to estimate transmit vector channel covariance matrices which form objectives and constraints in quadratic optimization problems leading to optimum beam former solutions for the single user case, and multiple user case. The new invention in capable of substantial frequency re-use capacity improvement in a multiple user cellular network.

6 Claims, 11 Drawing Sheets

U.S. PATENT DOCUMENTS

| | | | | |
|---|---|---|---|---|
| 5,386,589 A | | 1/1995 | Kanai | 455/69 X |
| 5,412,414 A | | 5/1995 | Ast et al. | 342/372 X |
| 5,428,712 A | | 6/1995 | Elad et al. | 395/51 |
| 5,459,668 A | | 10/1995 | Dogan et al. | 364/456 |
| 5,495,256 A | | 2/1996 | Piper | 342/378 X |
| 5,515,378 A | | 5/1996 | Roy, III et al. | 455/525 |
| 5,542,101 A | | 7/1996 | Pal | 455/276.1 |
| 6,006,110 A | * | 12/1999 | Raleigh | 455/561 |
| 6,101,399 A | * | 8/2000 | Raleigh et al. | 455/561 |
| 6,219,561 B1 | * | 4/2001 | Raleigh | 455/561 |

OTHER PUBLICATIONS

North et al., "Multichannel Adaptive Equalization for Improved Performance in LOS Digital Radio," 1994 IEEE Milcom. Conference Record (CAT. No. 94 CH34009), Proceedings of MILCOM '94, Fort Monmouth, NJ, USA Oct. 2–5, p. 117–122, vol. 1, XP002065786.

* cited by examiner

METHOD AND APPARATUS FOR ADAPTIVE TRANSMISSION BEAM FORMING IN A WIRELESS COMMUNICATION SYSTEM

This application is a continuation of U.S. patent application Ser. No. 08/491,044 filed Jun. 16, 1995 now U.S. Pat. No. 6,101,399, which is a continuation in part of U.S. patent application Ser. No. 08/394,652, filed Feb. 22, 1995 now abandoned.

BACKGROUND OF THE INVENTION

I. Field of the Invention

The present invention relates to the formation of antenna beam patterns (beamforming), and more particularly to a technique for adaptive transmit beamforming based on the result of adaptive receive beamforming.

II. Description of the Related Art

Within wireless mobile communication systems, directive antennas may be employed at base station sites as a means of increasing the signal level received by each mobile user relative to the level of received signal interference. This is effected by increasing the energy radiated to a desired recipient mobile user, while simultaneously reducing the interference energy radiated to other remote mobile users. Such reduction in the interference energy radiated to mobile users over other wireless channels may be achieved through generation of spatially selective, directive transmission beam patterns. Unlike "line-of-sight" radio links, a number of signal transmission paths typically comprise each wireless communication channel.

FIG. 1 shows an illustrative representation of a wireless "multipath" communication channel between a base station 2 and a remote mobile user 4. The various signal transmission paths within such multipath communication channel arise from reflection of the transmitted signal by dominant reflection surfaces 6, and by minor reflection surfaces 12, between the base station 2 and remote mobile user 4. Accordingly, techniques for improving signal reception in line-of-sight radio systems are often not directly applicable to multipath signal environments. For example, in line-of-sight system the "gain" of an antenna typically varies inversely to antenna beam width. However, if a given antenna beam width is made less than the angular region encompassing the various signal paths comprising a multipath communication channel, further reduction in the beam width may reduce the energy radiated along some of the angular paths. In turn, this may actually decrease the effective time average gain of the antenna.

Within wireless mobile communication systems, three techniques have been developed for improving communication link performance using directive transmit antennas: (i) selection of a particular fixed beam from an available set of fixed beams, (ii) adaptive beam forming based on receive signal angle estimates, (iii) adaptive transmission based on feedback provided by the remote mobile user, and (iv) adaptive transmit beam forming based upon the instantaneous receive beam pattern. Each of these techniques is described briefly below.

In the first technique, one of several fixed base station antenna beam patterns is selected to provide a fixed beam steered in a particular direction. The fixed antenna beams are often of equal beam width, and are often uniformly offset in boresight angle so as to encompass all desired transmission angles. The antenna beam selected for transmission typically corresponds to the beam pattern through which the largest signal is received. The fixed beam approach offers the advantage of simple implementation, but provides no mechanism for reducing the signal interference power radiated to remote mobile users within the transmission beam of the base station. This arises because of the inability of the traditional fixed beam approach to sense the interference power delivered to undesired users.

The second approach involves "adapting" the beam pattern produced by a base station phase array in response to changing multipath conditions. In such beamforming antenna arrays, or "beamformers", the antenna beam pattern is generated so as to maximize signal energy transmitted to ("transmit beamforming"), and received from ("receive beamforming"), an intended recipient mobile user.

While the process of transmit beamforming to a fixed location over a line-of-sight radio channel may be performed with relative ease, the task of transmitting to a mobile user over a time-varying multipath communication channel is typically considerably more difficult. One adaptive transmit beamforming approach contemplates determining each angle of departure (AOD) at which energy is to be transmitted from the base station antenna array to a given remote mobile user. Each AOD corresponds to one of the signal paths of the multipath channel, and is determined by estimating each angle of arrival (AOA) at the base station of signal energy from the given user. A transmit beam pattern is then adaptively formed so as to maximize the radiation projected along each desired AOD (i.e, the AOD spectrum), while minimizing the radiation projected at all other angles. Several well known algorithms (e.g., MUSIC, ESPRIT, and WSF) may be used to estimate an AOA spectrum corresponding to a desired AOD spectrum.

Unfortunately, obtaining accurate estimates of the AOA spectrum for communications channels comprised of numerous multipath constituents has proven problematic. Resolving the AOA spectrum for multiple co-channel mobile units is further complicated if the average signal energy received at the base station from any of the mobile units is significantly less than the energy received from other mobile units. This is due to the fact that the components of the base station array response vector contributed by the lower-energy incident signals are comparatively small, thus making it difficult to ascertain the AOA spectrum corresponding to those mobile units. Moreover, near field obstructions proximate base station antenna arrays tend to corrupt the array calibration process, thereby decreasing the accuracy of the estimated AOA spectrum.

In the third technique mentioned above, feedback information is received at the base station from both the desired mobile user, and from mobile users to which it is desired to minimize transmission power. This feedback permits the base station to "learn" the "optimum" transmit beam pattern, i.e., the beam pattern which maximizes transmission to the desired mobile user and minimizes transmission to all other users. One disadvantage of the feedback approach is that the mobile radio needs to be significantly more complex than would otherwise be required. Moreover, the information carrying capacity of each radio channel is reduced as a consequence of the bandwidth allocated for transmission of antenna training signals and mobile user feedback information. The resultant capacity reduction may be significant when the remote mobile users move at a high average velocity, as is the case in most cellular telephone systems.

The fourth conventional technique for improving communication link performance involves use of an optimum receive beam pattern as the preferred transmission beam pattern. After calibrating for differences between the antenna array and electronics used in the transmitter and receiver, it is assumed that the instantaneous estimate of the nature of the receive channel is equivalent to that of the transmit channel. Unfortunately, multipath propagation and other transient channel phenomenon can substantially eliminate any significant equivalence between frequency-duplexed transmit and receive channels, or between time-division duplexed transmit and receive channels separated by a significant time interval. As a consequence, communication link performance fails to be improved.

OBJECTS OF THE INVENTION

Accordingly, it is an object of the invention to provide an adaptive transmit beamforming technique which enhances remote user received signal quality by utilizing the uplink signal energy received from remote users without the need for feedback from the mobile user.

It is another object of the invention to provide an adaptive transmit beamforming technique which accounts for the presence of multipath fading inherent in the communication channel.

It is yet another object of the invention that the beamforming technique be independent of antenna array geometry, array calibration, or of explicit feedback control signals from remote users.

It is another object of the invention to provide adaptive transmit beam forming which improves signal quality received by a desired user and while simultaneously reducing interference energy received by other undesired users so as to, within a cellular communication network, improve communication traffic capacity, and/or to increase base station coverage area, and/or to improve call quality.

SUMMARY OF THE INVENTION

The adaptive transmission approach of the invention offers the advantages of adaptive transmission using feedback without the associated mobile radio complexity increase and information capacity penalty. The technique has been developed to exploit structured variation which occurs in the multipath fading present in the wireless antenna array channel. Thus, multipath propagation effects are explicitly accounted for in the problem approach. The technique is blind in that the antenna beam is formed in the absence of explicit knowledge of the array geometry, and without the necessity of array calibration or mobile feedback. The basic approach is to estimate the optimum transmit antenna beam pattern based on certain statistical properties of the received antenna array signals. Recently developed results in blind signal copy of multiple co-channel signals using antenna arrays are thus exploited to make possible the estimation of the receive signal statistics. The optimum transmit beam pattern is then found by solving a quadratic optimization subject to quadratic constraints. The adaptive transmission system is suitable for use in conjunction with either a diplexed transmit/receive antenna array, or with separate transmit and receive arrays.

BRIEF DESCRIPTION OF THE DRAWINGS

Additional objects and features of the invention will be more readily apparent from the following detailed description and appended claims when taken in conjunction with the drawings, in which:

DETAILED DESCRIPTION OF THE INVENTION

I. Overview of Beamforming Network

Figure 2A:
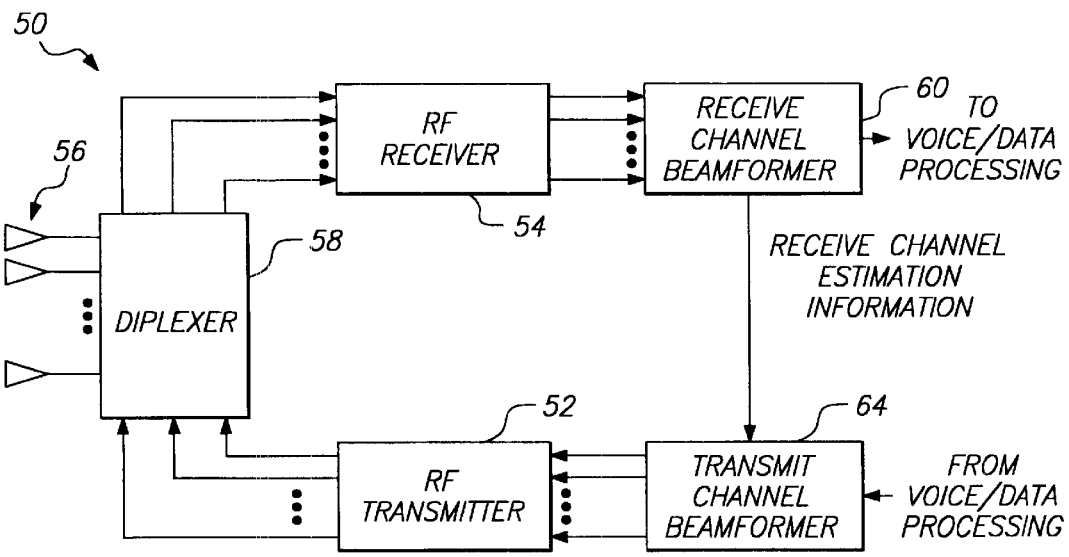
FIG. 2A is a block diagram of the physical implementation of a beamforming network configured to perform adaptive beam forming in accordance with the present invention.

Turning now to FIG. 2A, a block diagram is shown of the physical organization of a beamforming network 50 configured to perform adaptive beam forming in accordance with the present invention. In an exemplary embodiment the beamforming network 50 is disposed within a base station of a cellular communications network, in which is included a transceiver comprised of a radio frequency (RF) transmitter 52 and an RF receiver 54.

In the embodiment of FIG. 2A, a base station antenna array 56 serves to produce independent transmit and receive antenna beams for facilitating communication with one or more mobile units (not shown). The term "receive channel vector" is employed to indicate that each antenna element within the base station antenna array 56 will form a propagation channel to a given remote user. The composite array channel may be represented as a vector having elements corresponding to each individual antenna channel. As is described herein, statistical characterization of the receive channel vector provides information which may be used by the base station to determine an "optimal" transmit beam pattern, i.e., a transmit beam pattern which maximizes the average signal-to-interference power delivered to a given mobile user. This obviates the need for the mobile unit to provide feedback information to the base station relating to propagation characteristics of the transmit channel. This in turn simplifies implementation of the mobile unit, and preserves channel resources for data transmission by eliminating the need for "mobile unit feedback" relating channel characteristics to the base station.

As is indicated by FIG. 2A, a diplexer 58 can be employed to allow the antenna array 56 to be used for both transmit and receive operation by isolating the RF receiver 54 from the RF transmitter 52. A receive channel beamformer 60 cooperates with the RF receiver 54 to adaptively optimize the receive antenna beam in order to improve received signal quality. Similarly, a transmit channel beamformer 64 cooperates with the RF transmitter 52 to adapt the transmit antenna beam to optimize some characteristic of transmission quality. In an exemplary embodiment the transit channel beamformer 64 and receive channel beamformer 60 are each implemented as a special purpose digital signal processor (DSP).

Figure 2B:
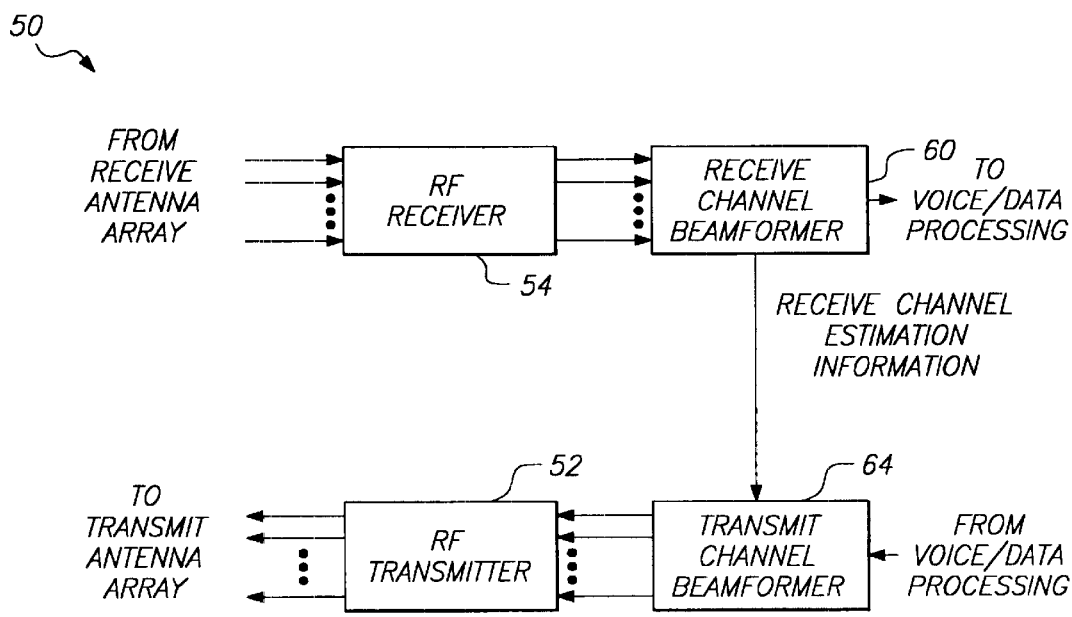
FIG. 2B is a block diagram of the physical implementation of a beamforming network in which a diplexor is employed to allow the antenna array to be used for both transmit and receive operation.

In another embodiment of the invention, distinct antenna arrays are used for signal reception and transmission as illustrated in FIG. 2B. In the embodiment of FIG. 2B, a diplexer is not required since a dedicated receive antenna array (not shown) is connected to the RF receiver 54, and a dedicated transmit antenna array (not shown) is connected to the RF transmitter 52. The receive and transmit antenna arrays are designed to provide identical radiation characteristics when operated at the receive and transmit frequencies, respectively. Accordingly, in many instances the physical geometries of the transmit and receive antenna arrays are simply physically scaled to account for the fractional difference in the receive and transmit RF wavelengths. The embodiment of FIG. 2B substantially eliminates the potential introduction of error arising from use of a single antenna array and diplexer.

Figure 3:
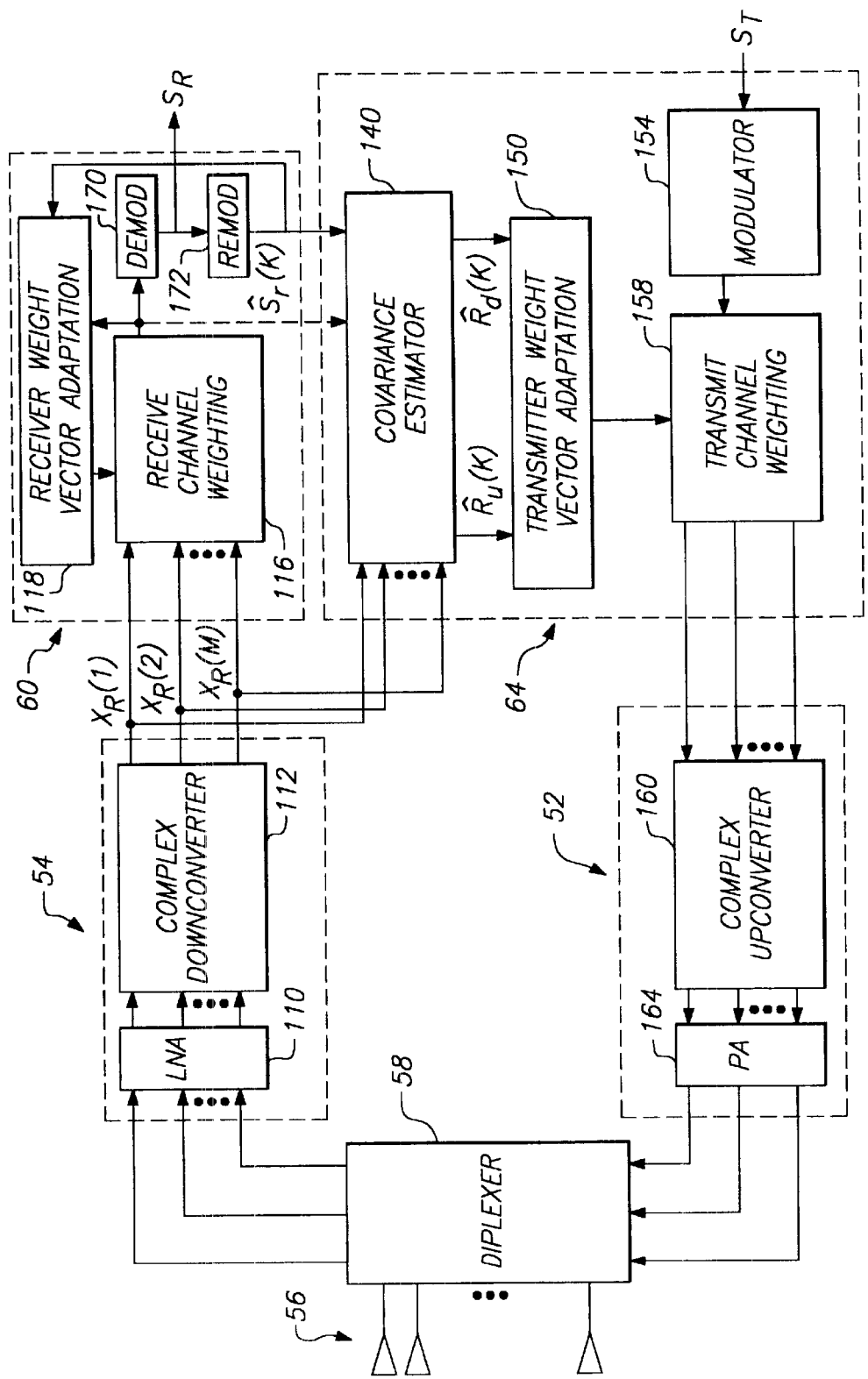
FIG. 3 is a functional block diagrammatic representation of a beamforming network of the present invention.

Turning now to FIG. 3, a functional block diagrammatic representation is provided of a beamforming network of the present invention. In FIG. 3, solid lines are used to represent functional elements and dashed lines are employed to identify the physical components of FIG. 2. The RF receiver 54 is functionally comprised of a low-noise amplifier (LNA) network 110, and a complex downconverter 112. The complex downconverter 112 is disposed to frequency downconvert the received RF signal energy after processing by the LNA network 110. The downconverted signal energy is then digitally sampled and provided to a receive channel weighting module 116 of the receive channel beamformer 60. The weights applied by the receive channel beamformer 60 to each of the M downconverted antenna element outputs $x_{R,m}(k)$, m=1 to M, of the complex frequency downconverter 112 are determined by a receiver weight vector adaptation module 118. In the exemplary embodiment the receiver weight vector adaptation module 118 determines a receive channel weight vector, $w_R$, which maximizes the signal quality received over the desired inbound frequency channel.

In the embodiment of FIG. 3, a vector channel covariance estimator 140 within the transmit beamformer 64 operates to produce a statistical characterization of a receive channel vector using: (i) the outputs $x_{R,m}(k)$, m=1 to M, of the complex frequency downconverter 112, and (ii) an estimate of the desired signal $\hat{S}_r(k)$ generated in the receive channel beamformer 60. For present purposes the receive channel vector may be viewed as being representative of the multi-path communications channel from a mobile user (not shown in FIG. 3) to the antenna array 56. In an exemplary embodiment the statistical characterization carried out within the covariance estimator 140 yields an estimated receive channel covariance matrix used during the transmit beamforming process. Throughout the following description, scalar quantities are represented using lower case characters of standard type, vector quantities are represented using lower case characters of bold type, and matrix quantities are represented using upper case characters of bold type.

Within the transmit channel beamformer 64, an optimal transmit beam pattern weight vector is generated by a transmit channel weight vector adaptation module 150 based on the results of the statistical characterization of the receive channel vector. This weight vector, $w_T(t)$, optimizes a particular aspect (e.g., average desired signal to undesired interference ratio) of the signal energy within the transmission range of the base station array 56. In the exemplary embodiment, the optimal transmit beam pattern weight vector is generated using the estimated desired receive channel covariance matrix, $\hat{R}_d(k)$, and undesired interference covariance matrix, $\hat{R}_u(k)$, both of which are compiled within the covariance estimator 140.

As is indicated by FIG. 3, the signal information ($S_T$) to be transmitted to the desired mobile radio unit is used to modulate a digital baseband carrier within a modulator 154. The modulated signal is then applied to a transmit channel weighting module 158 disposed to weight, on the basis of the optimized transmit pattern weight vector, the input signals corresponding to each element of the antenna array 56. The weighted set of input signals produced by the weighting module 158 are then upconverted in frequency within a complex frequency upconverter 160 of the RF transmitter 52. The resultant frequency-upconverted signals are then amplified by a bank of power amplifiers 164, and provided to the antenna array 56 for transmission via diplexer 58.

In the exemplary embodiment an improved estimate of the received signal is obtained through utilization of a demodulator 170 and remodulator 172. The received signal is demodulated within demodulator 170 in order to recover the essential characteristics of the modulating signal. In the case of an analog FM signal, this involves recovery of the FM waveform. In the case of a digitally modulated signal (BPSK, FSK, QPSK, etc.), the demodulator 170 forms hard decisions as to the value of each digital symbol. The demodulated signal is then processed based upon some predefined characteristic of the signal and modulation pattern. For example, a demodulated analog FM signal could be lowpass filtered based upon a known signal information bandwidth as a means of obtaining an improved post-demodulation signal estimate. In the case of digital modulation, error correction could be implemented in order to remove bit errors, thus improving estimated signal quality. In addition, training signals (i.e., pilot tones, SAT tones, etc.) may optionally be employed in lieu of, or in conjunction with, the aforementioned "blind" techniques.

Again referring to FIG. 3, the processed demodulated signal is then used by demodulator 172 to remodulate an RF carrier, thereby producing an improved modulated signal estimate. The improved signal estimate is then used by the receiver weight vector adaptation block 118 and the covariance estimate 140. Other techniques, which do not rely upon such a demodulation/remodulation procedure, can be devised for obtaining a sufficiently accurate received signal estimate. FIG. 3 simply illustrates a particular exemplary embodiment incorporating a demodulator and remodulator.

In the present embodiment, the demodulator 170 and remodulator 172 or the receive channel beamformer 60 are operative to produce a received signal estimate $\hat{s}_r$. The quantity $\hat{S}_r$ is then employed by the covariance estimator 140 to estimate the covariance matrix of the receive channel. The receive channel beamformer 60 could of course be replaced by numerous alternative structures including, for example, multi-antenna sequence estimators, maximum likelihood receiver structures, or multiple element decision feedback equalizers. Any of these alternative structures could also be used to provide the quantity $\hat{s}_r$ for use in estimating the received channel covariance statistics.

A detailed description of the adaptive transmit beamforming contemplated by the invention is provided in the following sections. Specifically, section II sets forth a description of transmit and receive multipath antenna channel models, as well as an introduction to the approach of utilizing receive channel statistics during transmission channel beamforming. Section III discusses the extension of the single-user beamforming approach of section II to an environment which includes multiple mobile users.

In section IV, an exemplary method is described for estimating receive channel statistics useful for effecting the transmit channel beam forming of the present invention. Finally, section V provides a description of various techniques for calibrating the transmit and receive channel beamforming apparatus.

II. Blind Beamforming Using Multipath Signals

As mentioned above, an initial step within the present invention involves statistically characterizing a receive channel vector representative of the multipath communications channel from a mobile user to a base station antenna array 56. In order to facilitate understanding of this process, a mathematical description will first be provided of an exemplary receive channel vector corresponding to a multi-element antenna array. It will then be shown that a high degree of similarity exists between a covariance characterization of the receive channel vector, and a covariance characterization of the transmit channel vector. The present invention makes use of the similarity between the receive and transmit channel covariance characterizations, notwithstanding the typical lack of correlation between the instantaneous transmit and receive channel vectors. As will also be described, the similarity between receive and transmit covariance makes it possible to determine an advantageous transmit beam pattern in the absence of explicit knowledge of the antenna array configuration. In this sense, the optimal beamforming of the present invention may be considered to be "blind" with respect to antenna array configuration.

Figure 1:
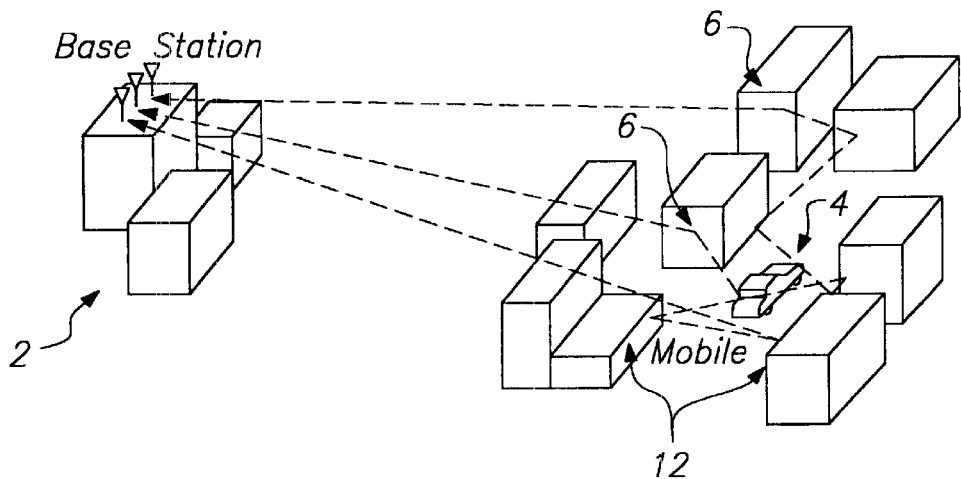
FIG. 1 is an illustrative representation of a multipath propagation channel between a base station and a remote user station.

The optimal transmit beamforming technique of the present invention is of particular utility in multipath propagation environments, in which mountains, buildings and the like create multipath interference (FIG. 1). In FIG. 1, energy radiated from the antenna array at each base station 2 is reflected by the dominant reflectors 6. Many local reflectors 12 nearby the mobile unit 4 also contribute to energy reflection. As the position of the mobile unit 4 varies, the phase length to each dominant reflector 6 and to each local 12 reflector correspondingly varies, which results in a time-variant vector propagation channel from the base station 2 to the mobile unit 4.

A vector channel model for the energy $y_R(t)$ received by a mobile unit from the base station may be expressed as:

$$y_R(t) = s_T(t) w_T(t)^H \left[ \sum_{l=1}^{L} \alpha_{T,l}(t) a_T(\theta_l) \right] + n_T(t) \qquad (1)$$

$$= s_T(t) w_T(t)^H h_T(t) + n_T(t)$$

where $s_T(t)$ denotes the complex-valued signal transmitted to the mobile unit, where $n_T(t)$ represents the complex-valued M-element noise vector received at the mobile unit, where $w_T(t)^H$ corresponds to the Hermetian transpose of the M-element complex-valued weight vector $w_T(t)$ representative of the M-element base station transmit antenna array 56, and where $h_T(t)$ represents the M-element time varying transmit channel array response vector. In addition, the time-varying amplitude loss for the $1^{th}$ of L signal propagation paths between the base station transit antenna array 56 and the mobile unit is given by $\alpha_{T,l}(t)$. Finally, $a_T(\theta_l)$ corresponds to the transmit array response vector due to the propagation path along the $1^{th}$ path of departure $\theta_1$. Each element within $a_T(\theta_1)$ represents the complex magnitude of the field radiated in the direction $\theta_1$ by an antenna element when a unit amplitude radiation signal is applied to the antenna element. Although for purposes of clarity, the base station transit antenna array 56 is assumed to be comprised of M omnidirectional elements and the mobile unit equipped with a single omnidirectional antenna, the following analysis may be readily extended to embodiments in which directional antenna elements are employed.

In a particular single-user implementation of the invention, a primary objective is to generate a base station transmit beam pattern which maximizes the signal relative to the noise within the received mobile signal $y_R(t)$. Since in the single-user case one is not concerned with minimizing interference to mobile units within other cells operative on the same frequency channel, this objective may be attained by simply maximizing the signal received at the single mobile unit. The single user case approximates conditions in cellular networks characterized by large geographic separation between base stations utilizing the same frequency channels. Ideally, the value of the transmit channel array response vector $h_T(t)$ would be determined on an instantaneous basis, which could easily be shown to allow determination of the transmit beam weight vector $w_T(t)$ resulting in the reception of the maximum possible signal power at the mobile unit. Unfortunately, it is not generally possible to instantaneously determine an accurate transmit channel array response vector $h_T(t)$ by instantaneously characterizing the receive channel from the mobile unit. This is a consequence of the frequency duplexed operation typical of most cellular systems, in which each frequency-duplexed communication channel is assigned different uplink and downlink frequencies. The difference in transmit and receive frequencies results in minimal correlation existing between the instantaneous transmit and receive channel array response vectors. This tends to preclude determination of an optimal transmit beam weighting vector $w_T(t)$ using instantaneous values of the receive channel array response vector.

In contrast, it has been found that there exists significant correlation between time-averaged covariance behavior of frequency-duplexed transmit and receive channel pairs. Since what follows will pertain to time-averaged channel covariance behavior, a time-independent transmit beam weight vector notation $w_T$ will be used in lieu of a time-dependent transmit beam weight vector $w_T(t)$. This does not imply that the weight vector $w_T$ will be completely time-independent, but rather that the weight vector $w_T$ will not vary significantly over the time periods within which are accumulated the channel statistics required for the covariance characterization of the channel described hereinafter.

An optimum average power transmit weight vector, $\hat{w}_T$, will now be defined as that beam pattern vector which maximizes the average signal power received by a given mobile unit, wherein $\hat{w}_T$ is expressed as follows:

$$\hat{w}_T = arg\left[\max_{w_T}[E(w_T^H h_T(t) s_T^*(t) s_T(t) h_T(t)^H w_T)]\right] \quad (2)$$
$$= arg\left[\max_{w_T}[w_T^H R_{h,T} w_T]\right]$$

where $R_{h,T}$ denotes the transmit vector channel covariance matrix evaluated at zero time shift and $E(\circ)$ denotes the statistical expectation operator. It may be assumed within equation (2) that the total power radiated by the base station antenna array is less than or equal to some predefined maximum base station power $P_{T^{max}}$, or, equivalently, that $w_T^H w_T < P_{T^{max}}$. One solution to equation (2) is obtained by setting the optimum weight vector $\hat{w}_T$ equal to the principal unit-norm eigenvector for $R_{h,T}$ scaled by $\sqrt{P_{T^{max}}}$.

If the transmit vector channel covariance matrix $R_{h,T}$ could be derived by the covariance estimator 140 in the absence of feedback from the mobile unit, the foregoing makes clear that the optimum transmit weight vector $\hat{w}_T$ could be straightforwardly determined. However, since the transmit channel information is generally unavailable to the base station, an estimation of the receive channel array response vector is manipulated within the covariance estimator 140 in order to closely approximate the transmit vector channel covariance matrix $R_{h,T}$. Once $R_{h,T}$ has been approximated, the transmit weight vector $\hat{w}_T$ is easily obtained within the transmitter weight vector adaptation module 150 in the manner described above.

In an alternate embodiment, the optimum transmit beam pattern weight vector is selected from a finite set of predetermined weight vectors, $\{W_T\}$ giving rise to a corresponding set of predefined transmit beam patterns. In this case the beam pattern may be formed by, for example, selectively assigning fixed amplitude and phase weights to each antenna element via a network of switched RF phased array elements. Rather than finding a closed form eigenvector solution to equation (2), in this embodiment a discrete search is performed for the one of the predefined transmit beam pattern weight vectors having the highest inner product with the desired covariance matrix $R_{h,T}$ per equation (2).

Various differences will now be examined between the frequency-duplexed transmit and receive channels over which communication occurs between a base station and a mobile unit. In a single-user environment, the vector $x_R(t)$ is representative of the set of output signals produced by the base station antenna array 56 in response to a signal $s_R(t)$ received from the mobile unit, and is given by:

$$x_R(t) = \sum_{l=1}^{L} a_R(\theta_l) \alpha_{R_l}(t) s_R(t) + n_R(t) \quad (3)$$
$$= h_R(t) s_R(t) + n_R(t)$$

where $n_R(t)$ is an M-element noise vector representative of the noise added by the base station receiver. In a multipath signal propagation environment, it has been generally found that little correlation exists between: (i) the instantaneous amplitude $\alpha_{R,l}(t)$ along each angle of arrival $\theta_l$, and (ii) the instantaneous propagation path amplitude $\alpha_{T,l}(t)$ along each angle of departure $\theta_l$ for the transmit channel. Accordingly, it is expected that attempting to map the instantaneous receive channel array response vector $h_R(t)$ to an instantaneous transmit channel weight vector $w_T(t)$, will generally not maximize the power delivered to the mobile unit.

While there is often little correlation between the instantaneous values of the transmit and receive vector channels, it has been found that if the transmit and receive antenna arrays are properly configured, there exists a high degree of similarity between $R_{h,T}$ and $R_{h,R}$. As a consequence, the covariance estimator 140 is designed to estimate an optimum transmit channel covariance matrix $R_{h,T}$ from a time-averaged receive channel covariance matrix $R_{h,R}$. It has been found that under the conditions described below, the substitution of the receive channel covariance matrix $R_{h,R}$ within equation (2) yields a value for $\hat{w}_T$ resulting in the base station delivering nearly as much power to the mobile user as would have been delivered had $R_{h,T}$ been used to derive $\hat{w}_T$.

From equations (1) and (2), the transmit channel covariance matrix may be expressed as:

$$R_{h,T} = E\left\{\left[\sum_{l=1}^{L} a_T(\theta_l) \alpha_{T,l}(t)\right]\left[\sum_{k=1}^{L} a_T(\theta_k) \alpha_{T,k}(t)\right]^H\right\} \quad (4)$$
$$= \sum_{l=1}^{L} E\{|\alpha_{T,l}(t)|^2\} a_T(\theta_l) a_T(\theta_l)^H$$

where $E(*)$ denotes the probabilistic expectation operation, and where it has been assumed that each angle of departure path fades independently, i.e., $$E(\alpha_{T,l}(t)\alpha^*_{T,k}(t))=0 \text{ for } i \neq k. \quad (5)$$

Similarly, the receive covariance matrix may be expressed as $$R_{h,R} = \sum_{l=1}^{L} E\{|\alpha_{R,l}(t)|^2\} a_R(\theta_l) a_R(\theta_l)^H \quad (6)$$

Equations (4) and (6) have been formulated under the assumption that an equal number of dominant reflectors, at identical locations, exist at the transmit and receive channel frequencies. This constraint will typically be met, since the existence of dominant reflectors of large size increases the likelihood of substantially similar reflection at the slightly different transmit and receive frequencies of each duplex communication channel.

As may be appreciated by comparing equations (4) and (6), the assumed equivalence of the transmit and receive channel covariance matrices is justified if (i) the average strengths $E\{|\alpha_l(t)|^2\}$ of the transmit and receive paths are equal, and if (ii) the receive and transmit array response vectors $a_R(\theta_l)$ and $\alpha_T(\theta_l)$ are substantially the same. For the typical case of a small frequency offset between transmit and receive channels, it has been found that condition (i) is generally met. That is, the transmit and receive channel average path strength is invariant with respect to transmit and receive frequency translation. Condition (ii) may be satisfied if the antenna array(s) used for transmission and reception are substantially insensitive to the frequency difference between the transmit and receive channel bands. In the case of a single antenna array disposed for transmit and receive operation via a diplexer, the requisite frequency insensitivity may be achieved through use of antenna having elements exhibiting substantially the same amplitude and phase response over both the transmit and receive channel bands. Alternately, the frequency difference between the transmit and receive channel bands may be compensated for by appropriately scaling the dimensions of, and spacing between, the antenna elements within separate transmit and receive antenna arrays.

The foregoing makes clear that transmit channel weight vector may be determined by the transmitter weight vector adaptation module 150 on the basis of a second order statistical characterization of the received array response vector. It is nonetheless to be understood that the compilation of other statistical characterizations of the receive array response vector as a means of determining an optimum transmit beam weight vector is also within the scope of the present invention.

III. Beamforming in Multiple User Environment

In the preceding section it was shown that, within a single user environment, a close approximation of an optimum transmit beam pattern could be effected using the receive array response vector covariance matrix. In the exemplary single user case discussed above, an optimum transmit beam pattern is obtained by simply attempting to maximize power delivered to the mobile user's receiver by the base station antenna array. In this section, a technique is described in which signal power delivered to an intended recipient mobile user by a base station array is maximized, while for other mobile users the base station array simultaneously minimizes the delivered interference power. In what follows the term "interference power" refers to signal energy transmitted by a base station array which is intended for reception by a particular mobile user, but which is also received by one or more other unintended mobile users.

It is noted that the exemplary embodiment described herein illustrates a scheme for forming an adaptive transmission beam for the purpose of reducing cellular frequency re-use intervals, thereby increasing network call traffic capacity. However, it is understood that the signal to interference maximization criteria described below may be equally applied in other contexts. For example, in an alternate embodiment these criteria may enable sharing of frequency channels by more than a single mobile user within a given cell as a means of increasing network call traffic capacity.

In conventional cellular systems of the type which allocate each channel frequency within a cell to a single mobile user, the cells are dimensioned such that base stations using the same frequency set are sufficiently separated to ensure that mutual "co-channel" (i.e., same frequency) interference is kept below an acceptable level. Unfortunately, this technique for partitioning frequencies among adjacent cells tends not only to reduce traffic capacity per base station, but also reduces trunking efficiency.

It is known that the ratio of the radius of an individual cell (R) to the distance between the centers of co-channel cells (D) determines amount of co-channel interference that a mobile user can expect to experience. It is also known that this ratio (D/R) determines the number of distinct channel sets that are assigned to cells throughout the cellular system. Increasing the value of D/R causes the mobile unit receive less interfering signal power (on average) and requires the cellular system to use a greater number of channel sets (i.e., a larger frequency re-use factor). Since the total number of frequency channels is fixed, increasing the number of channel sets reduces the number of frequency channels available to each cell and results in a reduction in cell capacity. A further capacity penalty arises from considerations of trunking efficiency, which become increasingly significant as the number of channels available to a given cell are reduced.

Accordingly, a trade-off typically exists between the average amount of interference received by a mobile unit within a cellular network, and the number of calls capable of being supported at any given time by each cell in the system. Since the present invention improves the average signal to interference ratio experienced by a mobile user's receiver by the use of adaptive transmit beamforming, the value of D/R for the system may be reduced until the mobile unit's interference threshold is once again reached. This advantageously results in an increase in system capacity due to the reduced D/R ratio. If instead the mobile unit's D/R is not reduced, the mobile unit will instead experience a higher quality connection.

It is further apparent that the present invention may also be employed to increase base station coverage area and/or improve some measure of call quality in lieu of, or in addition to, improving network capacity.

In the exemplary embodiment, an adaptive antenna array is employed at each base station as a means of reducing the interference delivered to undesired users within adjacent cells while simultaneously maximizing the average power to the desired user. In this way the frequency "re-use" interval of the cellular network is improved by reducing the number of cells needed to be interposed between base stations using the same frequency set. The interference power delivered by the base station array within a given cell to co-channel mobile users in adjacent cells is determined within the covariance estimator 140 by forming an "undesired" covariance matrix for each such user by statistically characterizing (as described in section I) the signal energy received therefrom. This allows formulation of an expression for an optimum transmit beam weight vector matrix $W_{T,OPT}$ as a function of:

(i) the desired covariance matrix characterizing the communications channel between each base station in the network and the "desired" mobile user serviced by each such base station utilizing the same frequency channel, and (ii) the undesired covariance matrices associated with each base station, wherein each undesired covariance matrix characterizes the signal propagation between a base station and one co-channel mobile user in an adjacent cell.

An exemplary expression for the matrix of optimum transmit beam weight vectors ($W_{T,OPT}$) is set forth below:

$$W_{T,opt} = arg\left\{\max_{W_T}\left[\min_i \frac{w_{T_i}^H R_{hTd_i} w_{T_i}}{\sum_{\substack{j=1 \\ j \neq i}}^{d} w_{T_j}^H R_{hTu_{i,j}} w_{T_j}}\right]\right\} \quad (7)$$

subject to the constraints of $$\frac{w_{T_i}^H R_{hTd_i} w_{T_n}}{\sum_{\substack{j=1 \\ j \neq i}}^{d} w_{T_j}^H R_{hTuj} w_{T_j}} \geq SNR_{min}$$

where $w_T = [w_{T1}\ w_{T2}\ \ldots\ w_{Td}]$ is the optimal transmit beam weight vector matrix, in which $w_{Td}$ corresponds to the optimum transmit weight beam vector of the dth base station antenna array;

$R_{hTd_i}$ is the desired transmit covariance matrix for user i;

$R_{hTd_{ij}}$ is the undesired transmit covariance matrix j for user i; and $SNR_{min}$ is the minimum allowable SNR for each mobile user.

The optimization expression of equation (7) is formulated in order to maximize the minimum signal to interference ratio ($SNR_{min}$) experienced by any given desired mobile user within the network. That is, it is intended that each desired mobile user receives sufficient signal energy to ensure that a minimum signal to interference plus noise ratio ($SINR_{min}$) required for acceptable communications quality is established for each mobile user. When it becomes infeasible for every desired user to experience a SINR greater than $SINR_{min}$, it is expected that the user experiencing the lowest SINR will be assigned to another frequency channel. The optimization contemplated by equation (7) is then performed again with fewer co-channel users.

In embodiments in which means are not provided for communication between the base stations of different cells, the exact interference power transmitted to each desired user by all adjacent cell base stations is unknown to a given base station. However, a given base station is capable of estimating the covariance matrices characterizing signal propagation from the base station to its desired user and the undesired users in adjacent cells. Accordingly, equation (7) may be reformulated as a maximization of the power delivered by each base station to the desired mobile user within its cell, subject to constraints on the amount of interference power which may be delivered to any one of the undesired co-channel users in adjacent cells. By setting an upper limit on the amount of interference power which any given base station is permitted to deliver to an undesired co-channel user in an adjacent cell, and a lower limit on the minimum power received by the desired user, each mobile user is guaranteed to experience an average signal to noise ratio in excess of $SINR_{min}$ in the event that a solution to the optimization problem is found.

This reformulated optimization may be expressed as:

$$w_T = arg\left\{\max_{w_T}(w_T^H R_{hTd} w_T)\right\} \quad (8)$$

subject to the constraints of, $w_T^H R_{hTd} w_T \geq P_{Rmin}$ $w_T^H R_{hTu_j} w_T \geq P_{Imax} \; \forall j$ $P_{Tmin} \leq w_T^H w_T \leq P_{Tmax}$ wherein, $R_{hTd}$ is the covariance matrix characterizing the communication channel between the desired user and base station within a given cell, $R_{hTU_j}$ is the interference covariance matrix from a given cell to the $j^{th}$ co-channel user within an adjacent cell, $P_{Imax}$ is the maximum interference power allowed to be delivered by any given base station to any undesired co-channel users within adjacent cells, $P_{Rmin}$ is the minimum signal power to be received by a desired user in order to ensure that each desired user experience a signal to interference ratio in excess of $SNR_{min}$, $P_{Tmax}$ is the maximum power capable of being transmitted by a base station, and wherein $P_{Tmin}$ is the minimum power which must be transmitted given a limited capability by the mobile receiver to reject signal power at adjacent channel frequencies.

Although capable of providing an desirable transmit beam weight vector for use at each base station, the optimization function of equation (8) is relatively computationally intensive in that a covariance matrix is required to be compiled for each undesired co-channel user. In what follows, the computational complexity of the optimization function of equation (8) is reduced by obviating the need for knowledge of the covariance matrix associated with each undesired co-channel user. This is accomplished by formulating an optimization expression dependent upon the summation of all undesired interference covariance matrices, rather than upon the individual undesired interference covariance matrices. The process of optimizing with respect to the summation of all interference power affords various advantages. For example, the necessary channel covariance estimates can be obtained using only the received signal vector and various ways an estimate of the desired mobile uplink signal. In contrast, individual undesired covariance matrices can generally only be determined if estimates of the undesired interfering signals are generated.

Assuming the various mobile uplink signals to be uncorrelated, the base station received signal vector covariance may be written as $$R_x = E\{x_R(t)x_R(t)^H\} = P_{s_d} R_{hR_d} + \sum_{i=1}^{N_{int}} P_{s_i} R_{hRu_i} + R_n \quad (9)$$

which allows the approximation, $$\sum_{i=1}^{N_{int}} P_{s_i} R_{hRu_i} = R_x - P_{s_d} R_{hR_d} - R_n \approx \hat{R}_x - P_{s_d} \hat{R}_{hR_d} \quad (10)$$

where $\hat{R}_x$ and $R_{hRd}$ are estimated covariance matrices corresponding to the raw received signal vector, $x_R(t)$, and the desired user channel vector channel and $P_{si}$ is the power transmitted by the $i^{TH}$ mobile user. The approximation in equation (10) allows formulation of an optimization function which depends upon the summation of the interference covariance matrices associated with a set of undesired co-channel users, rather than a function dependent upon derivation of a separate interference covariance matrix for each undesired co-channel user. More particularly, the simplified optimization function may be expressed as:

$$w_{T,OPT} = arg\{\max_{w_T}(w_T^H R_{hTd} w_T)\} \quad (11)$$

subject to the constraints of $$w_T^H\left[\left\{\sum_{i=1}^{N_{int}} R_{hTu_j}\right\} + I_M \frac{P_{Imax}}{P_{Tmax}}\right] w_T \leq P_{Imax}$$

where $P_{I,max}$ is the maximum allowable total delivered interference power, $P_{T,max}$ is the maximum allowable transmission power, and where $I_M$ is an M×M identity matrix. In addition, this simplified optimization function is subject to the feasibility checks of:

$$w_T^H w_T \geq P_{Tmin}$$

$$w_T^H R_{hTd} w_T \geq P_{Rmin}$$

One solution to equation (11) is the scaled, generalized eigenvector associated with the largest generalized eigenvalue of the following matrix pair:

$$\left(R_{hTd}, \left[\left\{\sum_{i=1}^{N_{int}} R_{hTu_i}\right\} + I_M \frac{P_{Imax}}{P_{Tmax}}\right]\right).$$

In an alternate embodiment, the optimum transmit beam pattern weight vector $\{W_T\}$ is selected from a finite set of pre-determined weight vectors giving rise to a corresponding set of predefined transmit beam patterns. In this case the beam pattern may be formed by, for example, selectively assigning fixed amplitude and phase weights to each antenna element via a network of switched RF phased array elements. Rather than finding a closed form eigenvector solution to equation (2), in this embodiment a discrete search is performed for the one of the predefined transmit beam pattern weight vectors providing the most advantageous solution to the optimization problem posed by equation (7), (8) or (11). In a specific implementation, the most advantageous solution is provided by the one of the predetermined transmit beam pattern weight vectors giving rise to the highest signal to interference ratio.

It is recognized that the random process associated with each vector channel is not strictly stationary. Therefore, the covariance matrix description of the channel can not be considered as time invariant. However, the process components causing variation in the time-averaged covariance estimates tend to vary more slowly than so-called fast fading components of the random channel process. These slowly changing process components include log normal shadowing, base station path propagation angles, and local scatterer propagation angles. While the preceding discussion expresses the covariance channel descriptions as time invariant, it is recognized that the covariance estimate must be viewed as an approximation for time average channel behavior over some finite length time window. Accordingly, an exemplary manner is described below for adapting the channel covariance estimates to the time variation in the slowly changing channel process components. Although many adaptive techniques could be used, one choice involves application of a first order IIR filter to successive estimates of the channel covariance. This may be expressed mathematically as $$\hat{R}(k) = \lambda \hat{R}(k-1) + \mu \hat{R}_{NEW}(k) \tag{12}$$

Where R(k) is the covariance estimate at time index k, $R_{NEW}(k)$ is the covariance estimate associated with the channel data gathered between time index k−1 and k, and $\lambda$ and $\mu$ are chosen to provide the desired IIR filter response.

Figure 4:
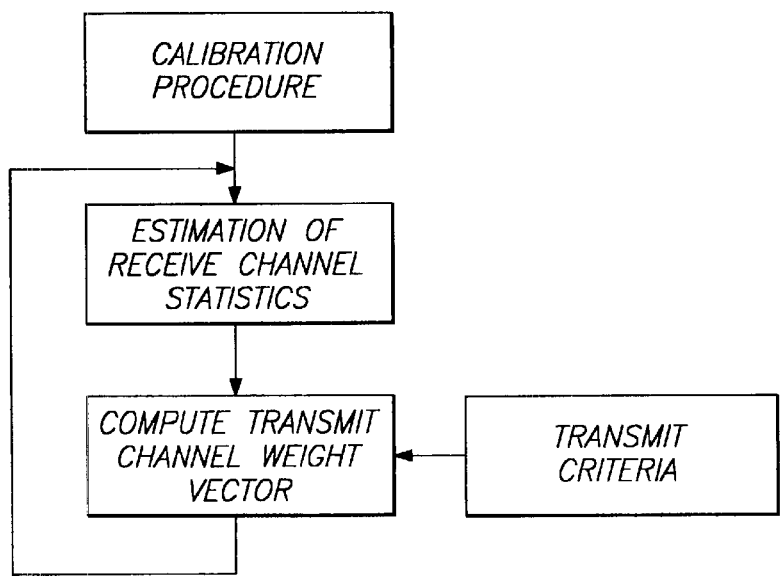
FIG. 4 provides a flowchart summarizing an exemplary procedure for using an optimization function to determine an optimum transmit weight vector.
Figure 5:
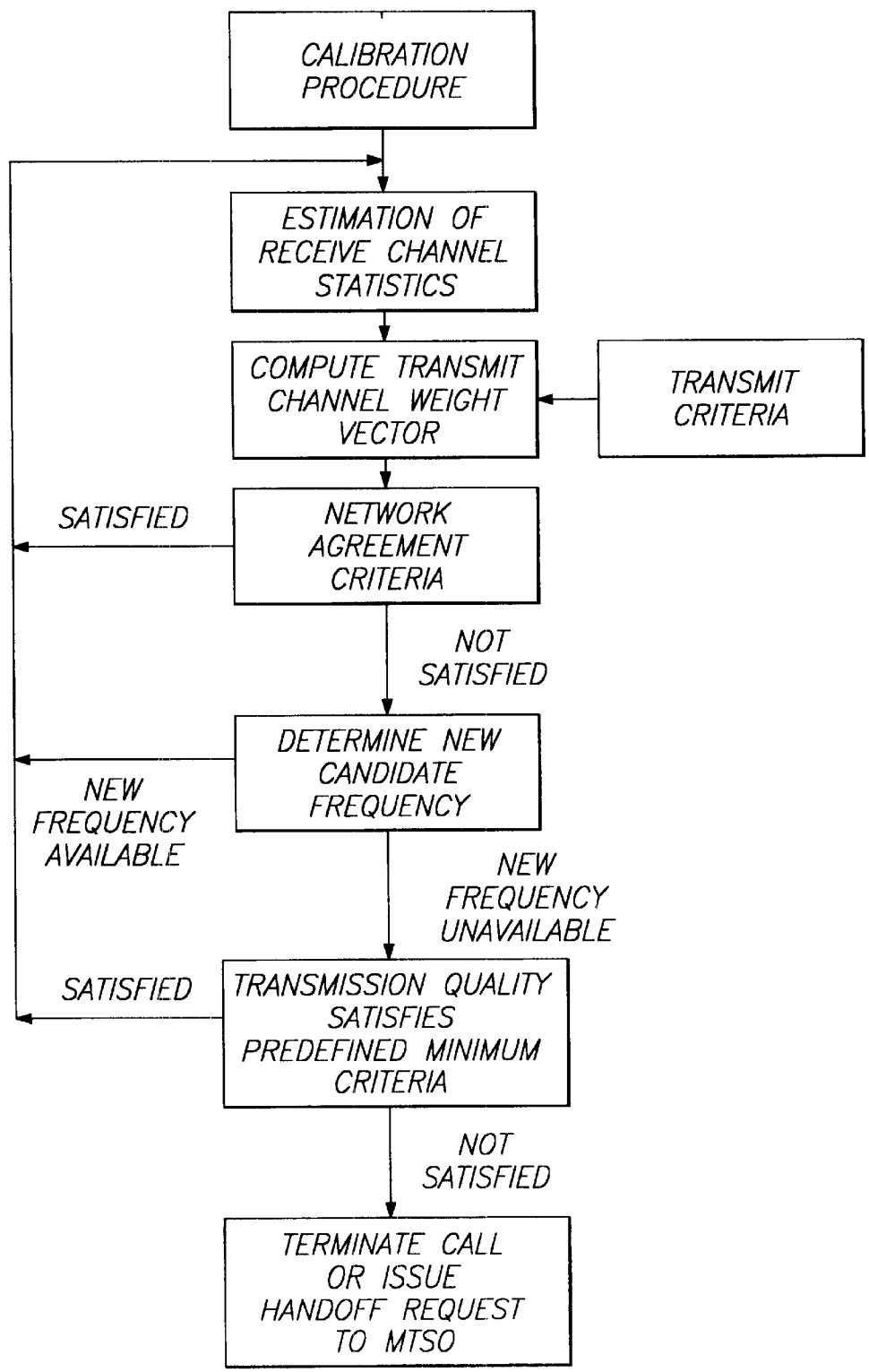
FIG. 5 is a flowchart outlining a general procedure for determining an optimum transmit weight vector by using transmit criteria in conjunction with network agreement criteria.

FIGS. 4 and 5 provide flowcharts representative of various methods for adaptively determining a transmit weight vector in accordance with the invention. In what follows the term "desired mobile unit" refers to the mobile unit in communication over a given frequency channel with the base station within which is disposed the beamforming network 50. Likewise, the term "undesired mobile unit" refers to a mobile within a different cell engaged in communication, on the given frequency channel, with the base station of the different cell.

Referring now to FIG. 4, there is provided a flowchart summarizing an exemplary procedure for using an optimization function such as equation (11) to determine the transmit weight vector. As an initial step, the beamforming network 50 (FIG. 2) is calibrated in accordance with one of the techniques described below in Section V. Next, the covariance estimator 140 (FIG. 3) determines an estimated receive channel covariance matrix as described above in Section II.

The transmitter weight vector adaptation module 150 then computes a transmit weight vector using the estimated receive channel covariance matrix. This computation is done in accordance with predefined network agreement criteria inherent within the optimization function evaluated within the weight vector adaptation module 150. In the exemplary case of the optimization function of equation (11), the pertinent transmit criteria is defined as maximization of the ratio of (i) the average power delivered to the desired mobile unit on a given frequency, to (ii) the average total interference delivered to undesired mobile units on the given frequency. If the feasibility checks associated with equation (11) are satisfied for transmission on the given frequency, then the given frequency is deemed satisfactory for communication with the desired mobile unit. If these feasibility checks are not satisfied, a different frequency is evaluated.

In an alternate embodiment, the relevant transmit criteria used in the procedure of FIG. 4 may simply mandate the maximization of the average signal power delivered to the desired mobile unit. This obviates the need for determination of an average receive channel covariance matrix representative of the communication channel to undesired users, and reduces computational complexity. This transmit criteria is believed to be particularly suitable for use in CDMA or frequency-hopped TDMA systems, in which undesired user interference statistics are either unavailable or uninformative.

In the general case, each base station in the cellular network could be constrained to limit transmission to undesired users on the basis of common "network agreement criteria". In an exemplary embodiment such network agreement criteria could comprise placing the following types of constraints upon the power transmitted by each base station:

1) an upper bound on the total power transmitted on a given channel to desired and undesired users, 2) a lower bound on the power received by the desired user, 3) a fixed upper bound on the interference power transmitted to any or all undesired users, 4) an adaptive bound on power transmitted to desired/undesired users dependent upon current traffic channel demand (thereby allowing a compromise to be made between network call capacity and call quality).

5) a lower bound on the total transmitted power 6) any other lower bound on acceptable signal or call quality to the desired user (i.e., average probability of bit error, etc.)

FIG. 5 is a flowchart outlining a general procedure for determining a transmit weight vector by using: (i) transmit criteria in the above-described manner (FIG. 4) to define the objective of an optimization function, and (ii) network agreement criteria to ensure that any optimum weight vector produced in (i) results in transmission satisfying predefined constraints. Again, the first step in the procedure of FIG. 5 involves calibration of the beamforming network 50 (FIG. 2) in accordance with one of the techniques described below in Section V. Next, the covariance estimator 140 (FIG. 3)

determines an estimated receive channel covariance matrix as described above in Section II.

The transmitter weight vector adaptation module 150 then computes an optimum transmit weight vector using the estimated receive channel covariance matrix. This computation is done in accordance with predefined network agreement criteria inherent within the optimization function evaluated within the weight vector adaptation module 150. The transmit weight vector solution is then evaluated in light of network agreement criteria of the type listed above to ascertain whether the resultant desired and/or undesired user transmission quality is appropriately bounded. If so, a new estimate is made of the receive channel covariance matrix (which in general will have changed due to movement of desired/undesired mobile units), and the above process is repeated. If the network agreement criteria are not satisfied, a new frequency is selected for at least one of the users and the above process is similarly repeated. If no new frequencies are available, either a call handoff request is sent to the MTSO, or appropriate indication is provided to the calling party. That is, the calling party is informed that communication is incapable of currently being established or maintained with the desired mobile unit, and the call is dropped.

In the general case, the evaluation of transmitted signal power in view of the network agreement criteria will be regularly repeated after communication has been established with the desired mobile unit. When the transmitted signal power begins to encroach upon the constraints set by the network agreement criteria (e.g., desired receiver power nears fixed lower bound), it will typically be desired that communication with the desired user be switched to a new frequency. Such encroachment may be caused by degradation in the quality of the communication channel allocated to the desired mobile unit. For example, channel conditions may deteriorate when the desired user becomes located near the edge of the cell area, while simultaneously becoming aligned between the base station and an undesired user in an adjacent cell.

When deteriorating channel conditions cause the network agreement criteria to become in some way "close" to being violated, a search for a new frequency channel may be commenced. This search process will typically continue until either: (i) signal transmission quality over the current frequency channel as defined by the network agreement criteria improves to a satisfactory extent, or (ii) the desired mobile unit is switched to a new frequency channel over which signal transmission complies with the network agreement criteria. It is a feature of the invention that the evaluation of an alternate frequency for transmission to a mobile unit can be accomplished without the need for the mobile to transmit on the frequency under consideration. Using signals received on the alternate frequency, a receive covariance matrix estimate is generated for the alternate frequency. Since there is not a desired user transmitting on the alternate frequency, the undesired covariance matrix $R_{alt,u}$ corresponds to the undesired user covariance matrix at the alternate frequency, $$R_{alt,u} = \sum_{i=1}^{N_{int}} R_{hRu_i} + R_n$$

where $N_{int}$ represents the number of interfering (i.e., undesired) users on the alternate frequency. Again assuming that the covariance matrices are frequency independent for small frequency shifts, the desired covariance matrix estimates compiled on the previous frequency is equivalent to $R_{alt,d}$, the desired user covariance matrix on the alternate frequency. Accordingly, the capability of signal transmission on the alternate frequency to comply with the network agreement criteria may be evaluated in the absence of desired user signal measurement on the alternate frequency.

It is anticipated that some hardware resources will be dedicated to updating the covariance matrix estimates on unused frequency channels. In doing so, the base station will be disposed to more rapidly find a suitable new frequency channel for a mobile unit assigned to a deteriorating channel.

As discussed above, when mobile units within adjacent cells are located in close proximity, the base stations within the adjacent cells may experience nearly simultaneous channel degradation. That is, the base stations within each cell may simultaneously experience interference on a given frequency channel due to the presence of the undesired co-channel user within the opposing cell. Under these circumstances it is desirable that only one of the two mobile users be reassigned to a new frequency channel, since this action alone will reduce the interference level experienced by each of the two base stations. One way of increasing the likelihood that only a single mobile user is reassigned is to require that a random time interval expire before any such reassignment may occur. Because each interval is random, it is highly unlikely that the two proximately located users will be reassigned contemporaneously. Hence, the co-channel interference experienced by each base station is reduced by allocating a new channel to only one of the proximately located mobile users.

In alternate implementations, searches may be performed substantially contiguously for the most advantageous frequencies over which communication may be maintained with desired mobile units. This is in contrast to the approach previously described, in which a search for a new channel is instigated only upon the transmitted signal power coming sufficiently "close" to a bound set by the network agreement criteria. This alternate approach involves continuously determining the candidate frequency channel satisfying the transmission quality criteria by the greatest margin. The most advantageous candidate channel may then be selected by, for example, ascertaining which of these optimal transmit weight beam vectors results in signal transmission best satisfying the pertinent network agreement criteria.

The most advantageous candidate frequency channel could instead be defined as the channel having an optimum transmit weight beam vector with which is associated the largest generalized eigenvalue solution of the applicable optimization function (e.g., equation 11). That is, the optimum transmit weight beam vector is determined for each candidate channel, and the largest eigenvalue associated with this set of weight vectors is then ascertained. The frequency channel corresponding to the transmit weight vector associated with this largest eigenvalue is then identified as the most advantageous frequency channel. Other approaches of utilizing an optimization function to identify a candidate frequency channel satisfying the relevant network agreement criteria are also within the scope of the present invention. It is expected that such other approaches may not identify the most advantageous frequency channel in view of the pertinent network agreement criteria, but will perhaps be capable of determining an acceptable channel in a less computationally intensive manner.

When the procedure outlined in FIG. 5 is used to identify a frequency channel to be assigned in response to a call request to/from a desired mobile unit, it is necessary to accumulate statistics associated with the desired mobile unit before initiating evaluation of candidate frequency channels.

The initiation of the evaluation process may be expedited by gathering channel statistics using the pilot channel during the paging or call set-up period. Once suitably accurate receive channel statistics (e.g., receive channel covariance matrix estimates) have been accumulated, channel frequency allocation proceeds in the manner outlined in FIG. 5.

IV. Estimating Transmit Channel Covariance Statistics

In accordance with the present invention, any of a number of estimated statistical characterizations of a given receive channel array response vector may be performed as part of the process of generating an optimal transmit beam weight vector. A preferred method of implementing one such statistical characterization, which involves compilation of the aforementioned receive channel covariance matrix, is described within this section. The method involves statistically characterizing the receive channel associated with the "desired user" to which information is to be transmitted, as well as characterization of the receive channel(s) associated with the "undesired user(s)" that receive interfering signal energy.

This statistical characterization method assumes the availability of a sampled received signal estimate, which is represented as $\hat{s}_R(kT)$, wherein "k" denotes the sample time index and "T" the sample interval. In an exemplary embodiment this signal estimate is derived from the output of the receive antenna array 56 (FIG. 2), and may be further processed to enhance signal estimation accuracy. For example, the signal estimate may be obtained by passing the output of the receive array 56, or of another dedicated antenna array, through a spatial and/or temporal receiver equalizer.

In alternate embodiments the signal estimate $\hat{s}_R(kT)$ is obtained by exploiting a sequence of known training signals which are transmitted from the desired user's mobile unit in order to assist in estimation of the wireless channel properties.

In one embodiment each received signal estimate is cross-correlated with the received data vector $x_R(kT)$ from the antenna array 56 as a means of forming the instantaneous receive channel array response vector estimate $\tilde{h}_R(KT)$. The following cross correlation operation defines $\tilde{h}_R(KT)$:

$$\tilde{h}_R(KT) = \frac{1}{2N_h} \sum_{k=K-N_h}^{K+N_h-1} x_R(kT)\hat{s}_R^*(kT) \qquad (13)$$

$$K = 0, 2N_h, 4N_h, 6N_h, \ldots$$

where $2N_h$ denotes the number of received data vector samples used to estimate $\tilde{h}_R(KT)$. In a preferred implementation the estimation block size is selected such that the time duration $(2N_h T)$ of each data block processed during each cross-correlation operation is made to be less than the time scale over which the instantaneous receive channel is expected to vary significantly. In this way an accurate estimation of instantaneous channel behavior is possible.

Once a set of array response estimates $\tilde{h}_R(KT)$ have been collected over a given time interval, a receive channel covariance matrix $R_{hRd}$, may be estimated as follows:

$$\hat{R}_{hRd}(KT)=\lambda \hat{R}_{hRd}((K-2Nh)T)+\mu \tilde{h}_R(KT)\tilde{h}_e^H(KT) \qquad (14)$$

Again, the present invention contemplates agreement between such a time-averaged covariance matrix estimation and the true transmit channel short term covariance matrix.

Under certain conditions, the time-averaged covariance matrix estimation may be improved using an estimation filter designed to filter the receive channel response vector estimate $\tilde{h}_R(KT)$. In accordance with the invention, the estimation filter is designed to correlate time-varying frequency and/or spatial properties of the multipath channel. This approach is believed to present a significant departure from conventional techniques, which generally assume near time-invariance over the desired estimation interval. If $\hat{h}_R(KT)$ represents the output of the estimation filter in response to the input $\tilde{h}_R(KT)$, the receive covariance matrix associated with the desired user (i.e., "the desired user covariance matrix") may be expressed as:

$$\hat{R}_{hRd}(KT)=\lambda \hat{R}_{hRd}((K-2N_h)T)+\mu \hat{h}_R(KT)\hat{h}_R^H(KT) \qquad (15)$$

The estimation filter may be realized as a linear FIR filter, as a linear IIR filter, as an adaptive filter structure (e.g., a Kalman filter), or as a non-linear filter structure. Moreover, the parameters (e.g., FIR taps or Kalman state-space model) of the estimation filter may be pre-computed based on expected channel time-domain correlation behavior. Alternately, the parameters of the estimation filter may be may be adapted in real-time as a function of measured channel behavior.

Rather than filtering the sequence $\tilde{h}_R(KT)$ as means of obtaining an improved array response estimate $\hat{h}_R(KT)$, the estimate of the desired user receive covariance matrix may first be formulated using only the sequence $\tilde{h}_R(KT)$. The resultant samples $\tilde{R}_{hRd}(KT)$ are then passed through an estimation filter similar to that described above to obtain $\hat{R}_{hRd}(KT)$. In this case, however, the estimation filter parameters are selected to directly optimize $\hat{R}_{hRd}$, rather than to indirectly improve this quantity through estimation filtering of $\hat{h}_R(KT)$.

As discussed above, the formulation of an optimal transmit channel covariance matrix involves not only estimation of a desired user receive covariance matrix $R_{hRd}$, but also entails estimation of an undesired user receive covariance matrix $R_{hRu}$. Again, compilation of the undesired user receive covariance matrix involves estimating the interfering signal energy transmitted by mobile users within other cells. One approach to estimation of the undesired user receive covariance matrix $R_{hRu}$ involves subtraction of a scaled version of the estimated desired user covariance matrix $R_{hRd}$ from the received signal vector covariance matrix $R_{xx}$:

$$\sum_{i=1}^{N_{int}} P_{su_i} \hat{R}_{hRui}(NT) = R_{xx}(NT) - P_{s_d}\hat{R}_{hRd}(NT) = \hat{R}_u \qquad (16)$$

In accordance with another aspect of the invention, an approach for estimating the undesired user covariance matrix is described which is particularly suitable for employment when relatively short sequences of samples (i.e., sample blocks) are being processed. Specifically, the received signal estimate $\{\hat{h}(kT)\hat{s}_d(kT)\}$ is subtracted from the received data vector $\{x(kT)\}$, thereby forming a vector $\{x_u(kT)\}$ representative of the sum of the undesired received signal power and receiver noise:

$$x_u(kT)=x(kT)-\hat{h}(kT)\hat{s}_d(kT) \qquad (17)$$

The undesired user covariance matrix $\hat{R}_{hRu}$ is then estimated as follows:

$$\hat{R}_u(KT) = \lambda \hat{R}_u((K-2N_h)T) + \mu \sum_{k=K-N_h}^{k+n_h-1} x_u(kT)x_u^H(kT) \quad (18)$$

As was mentioned above in connection with description of the desired covariance matrix $R_{hRd}$, it may at times be desirable to filter samples of the undesired covariance matrix using an estimation filter. Again, such an estimation filter serves to modify the current estimated covariance matrix in response to time-variation in the statistics of the true undesired channel response.

Following determination of the estimated desired and undesired receive channel covariance matrices, the optimal transmit beam weight vector is found by substituting these matrices into equation (11) as follows:

$$\hat{R}_h Rd \rightarrow \hat{R}_h Td \quad (19)$$

$$\hat{R}_u \rightarrow \sum_{i=1}^{N_{int}} R_h Tu_i$$

The foregoing procedure for optimal transmit beamforming illustrates a particular implementation of the invention, it being understood that other methods for adaptively estimating channel covariance are also within the scope of the invention.

V. Transmit and Receive Channel Calibration

In order to ensure that receive channel statistics are accurately "mapped" to transmit channel statistics which are useful for determining an optimal transmit beam weight vector, the transmit and receive sections of the particular transceiver employed are calibrated. The calibration procedure and apparatus described herein corrects for differences in the amplitude and phase match between the signal paths through the transceiver corresponding to each antenna element of the frequency channels. This "matching" correction allows receive channel statistics collected for each of the frequency channel to be accurately used within the corresponding transmit channel in the manner described in section IV. Although several specific approaches of a calibration procedure are set forth below, other approaches of correcting for amplitude and phase discrepancies between corresponding transmit and receive channel paths may be apparent to those skilled in the art in view of the teachings herein.

Figure 6:
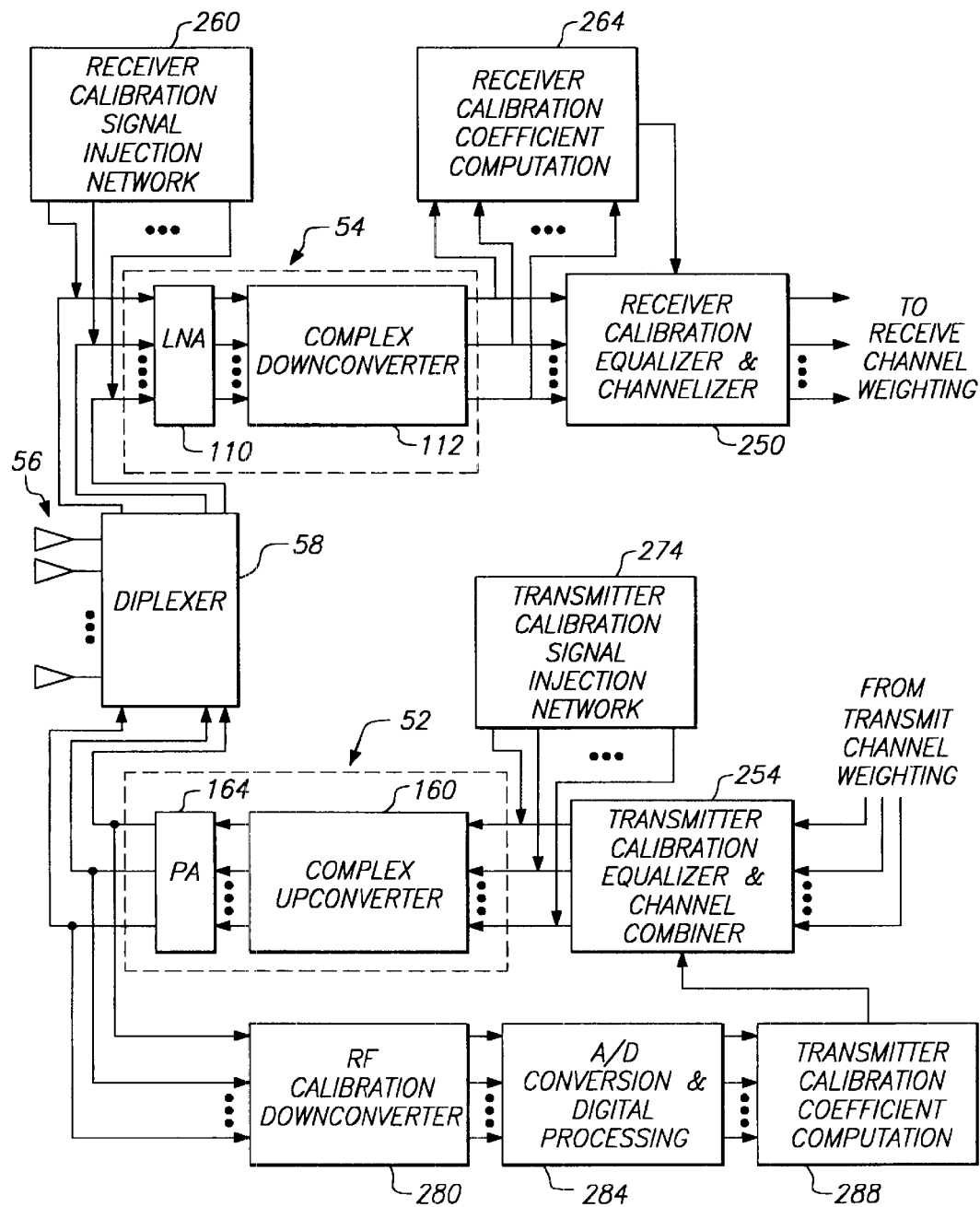
FIG. 6 is a block diagram of an exemplary calibration system incorporated within the adaptive beamforming network of FIG. 3.

Referring to FIG. 6, a block diagram is provided of an exemplary calibration system as incorporated within the adaptive beamforming network of FIG. 3. The calibration procedure contemplated by the invention involves two operations: (i) calibration of the antenna array 56 and diplexer 58, and (ii) calibration of the remaining electronics within the transmit and receive sections.

Since the antenna array 56 and diplexer 58 (i.e., the array assembly) are comprised of passive components, it is expected that matching (e.g., power matching, impedance matching) between these passive structures and both the transmit and receive and electronics will be relatively invariant over time and temperature. Accordingly, calibration of the matching between the array assembly and the remaining transmit and receive electronics within the adaptive beamforming network may be performed infrequently. As a first step in calibration of the array assembly, the match between the RF receiver 54 and the array assembly is determined for each receive frequency of interest. Similarly, the match between the RF transmitter 52 and the array assembly is also determined for each transmit frequency of interest. These measurements may be conducted at an antenna test range, or at any other appropriate calibration site.

The differences in the measured amplitude and phase match for each corresponding pair of transmit and receive frequencies are stored both within a receiver calibration equalizer & channelizer 250, and within a transmitter calibration equalizer & channel combiner 254. During operation of the adaptive beamforming network, equalization filters within the equalizers 250 and 254 are adjusted so as to compensate for the matching difference at each pair of corresponding transmit and receive frequencies.

Unlike the array assembly, the active components within RF transmitter 52 and RF receiver 54 may exhibit significant amplitude and phase drift as a function of time and temperature. In order to obviate the need for use of expensive, high-precision components in conjunction with compensation circuits as a means of minimizing such amplitude and phase drift, the present invention contemplates utilization of the self-calibration apparatus depicted within FIG. 6. The self-calibration technique described herein involves compensating for differences in amplitude and phase between the different propagation paths within the RF transmitter 52 associated with each antenna element, and likewise for such differences between the different propagation paths within the RF receiver 54. Measurements of the propagation of calibration signals over each path within the RF transmitter 52, and separately within the RF receiver 54, are conducted at each of the N transmit/receive frequency pairs of interest. The measurement results are then employed to compute calibration coefficients used in adjustment of the equalizers 250 and 254.

Referring to the receive section of FIG. 6, a receiver calibration signal injection network 260 is operative to generate calibration signal comprised of all the N RF receive frequencies of interest. This "wideband" calibration excitation may be accomplished either through generation of a plurality of discrete frequency signals, or through generation of a single wideband calibration signal. In either case, the same one or more receiver calibration signals are injected into each of the M signal paths linking each of the M elements of the array 56 to the RF receiver 54. After being downconverted in frequency, digitized, filtered and decimated within the receiver 54, the receiver calibration signals are processed by a receiver calibration coefficient computation circuit 264. In the exemplary embodiment, the computation circuit 264 measures the amplitude and phase difference exhibited by calibration signals of the same frequency after propagation through the receiver 54 on the M different signal paths associated with the antenna elements. A set of filter calibration coefficients are then computed for use in adjustment of either a single wideband equalization filter, or a plurality of narrowband equalization filters, disposed within the receiver calibration equalizer 250.

As mentioned above, calibration information obtained during calibration of the array assembly is also stored within the calibration equalizer. This calibration information, as well as the coefficients provided by the computation circuit 264, are together used to adjust the equalization filters within the calibration equalizer 250. This adjustment is designed to ensure that for each of the N frequency channels, a substantially identical amplitude and phase change occurs as a consequence of propagation through each of the M propagation paths of the RF receiver 54.

A similar calibration procedure may be used to compensate for the generally different amplitude and phase characteristics exhibited by each of the M signal propagation paths within the RF transmitter 52. In particular, a set of M identical wideband digital IF calibration signals are generated within a transmitter calibration signal injection network 274 for application to the M signal paths entering the RF transmitter 52. Each of these M wideband digital IF calibration signals are then interpolated, filtered, converted to analog signals, and subsequently translated to a higher analog frequency.

At the output of the bank of power amplifiers 164, the amplified calibration signals are coupled to a transmit section calibration receiver comprised of an RF calibration downconverter 280 and an A/D conversion & digital processing module 284. The RF calibration downconverter 280 is operative to translate the frequency of the amplified calibration signals to an intermediate frequency (IF). The resultant set of M IF signals are provided to an A/D conversion & digital processing module 284 disposed to digitize, filter, and decimate each IF signal. A transmitter calibration coefficient computation circuit 288 then measures the amplitude and phase difference exhibited by calibration signals of the same frequency carried by the M different outputs of the A/D conversion & digital processing module 284 where, again, each of the M outputs is associated with one of the M signal paths through the RF transmitter.

A set of filter calibration coefficients are then computed within the computation circuit 288 for use in adjustment of the single wideband, or multiple narrowband, equalization filters disposed within the transmitter calibration equalizer and channel combiner 254. These filter calibration coefficients, as well as the calibration information collected during calibration of the array assembly, are jointly used to adjust the equalization filters within the calibration equalizer & channel combiner 254.

Figure 7:
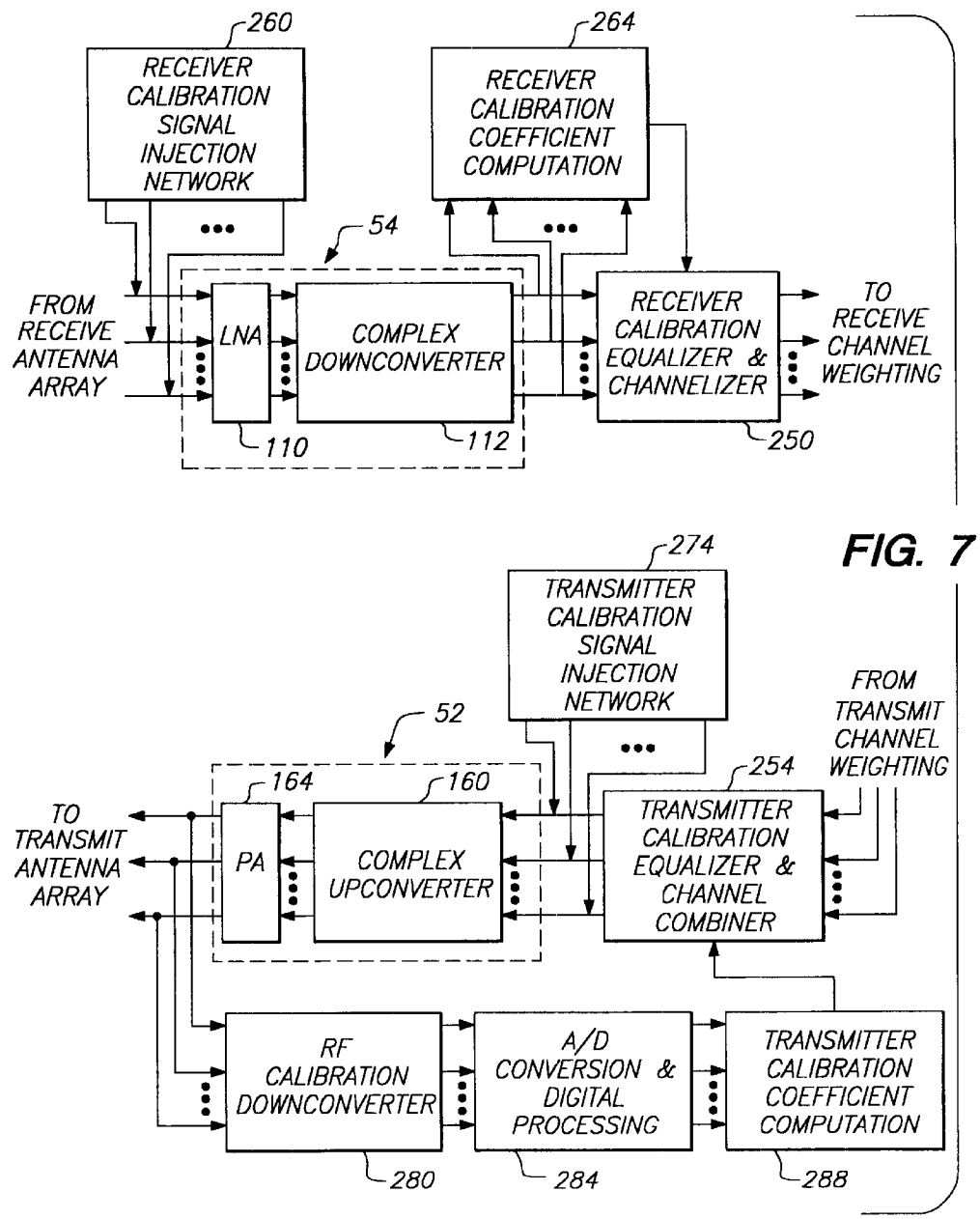
FIG. 7 shows an implementation of a calibration system within an adaptive beamforming network having different transmit and receive arrays.

The transmit section calibration receiver will typically also be calibrated in a manner substantially similar to that described above with reference to the RF receiver 54. In order to preserve clarity of representation, the calibration circuitry used in this secondary calibration process is not shown in FIG. 6. Finally, it is noted that the calibration system depicted in FIG. 6 is designed to be equally compatible with an adaptive beamforming network equipped with separate transmit and receive antenna arrays. The implementation of the calibration system within such an adaptive beamforming network is shown in FIG. 7.

Figure 8:
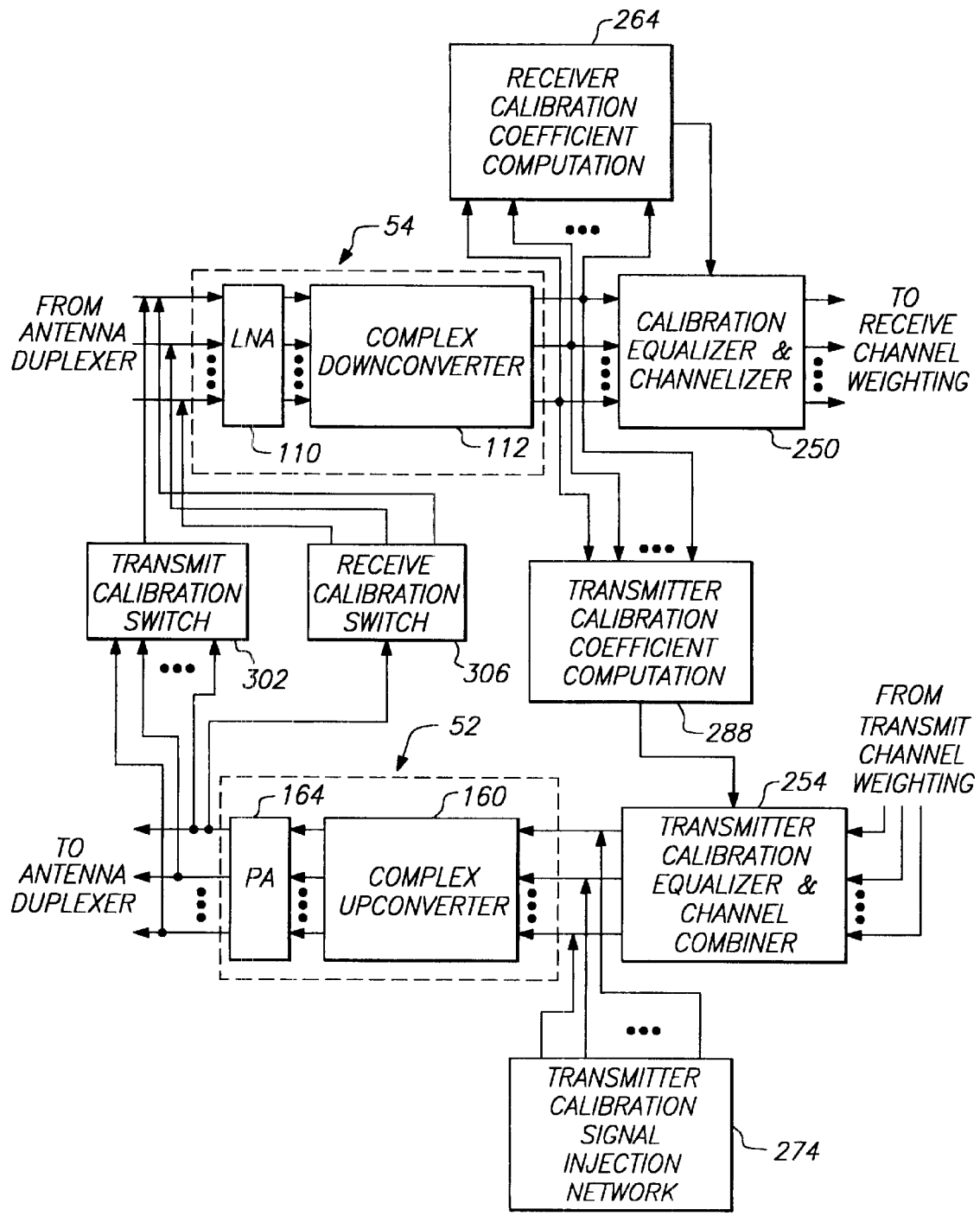
FIG. 8 provides a block diagram of a self-calibrated adaptive beamforming network in which the receive section of the beamforming network is advantageously utilized in lieu of a transmit section calibration receiver.

FIG. 8 provides a block diagram of a self-calibrated adaptive beamforming network in which the receive section of the beamforming network is advantageously utilized in lieu of a transmit section calibration receiver (FIG. 6). During calibration of the transmit section of the beamforming network, the transmitter signal injection network 284 again applies a wideband calibration signal to each of the M inputs to the RF transmitter 52. A transmit calibration switch 302 is operated, during calibration, so as to sequentially couple each one of the M calibration outputs of the RF transmitter 52 to a single one of the M inputs to the RF receiver 54. In the embodiment of FIG. 8, the bandwidth of the RF receiver 54 encompasses both the transmit and receive channel frequency spectra in order to facilitate processing of the transmit section calibration signals. Based on the content of the calibration signals processed by the RF receiver 54, the transmitter calibration coefficient computation circuit 288 then computes a set of filter calibration coefficients for use in adjustment of the equalization filter(s) disposed within the transmitter calibration equalizer and channel combiner 254.

The transmit calibration switch 302 similarly obviates the need for a receiver calibration signal injection network 260 (FIG. 6). In particular, during calibration of the receive section of the adaptive beamformer, a receive calibration switch 306 is closed so as to allow a receive channel calibration signal generated by one of the M paths of the RF transmitter 52 to be applied to the RF receiver 54. Calibration coefficients would then be computed by the receiver calibration coefficient computation circuit 264 in the manner described above. In this implementation, the bandwidth of the RF transmitter 52 is designed to accommodate the spectra occupied by both the set of transmit channels and the set of receive channels.

Figure 9:
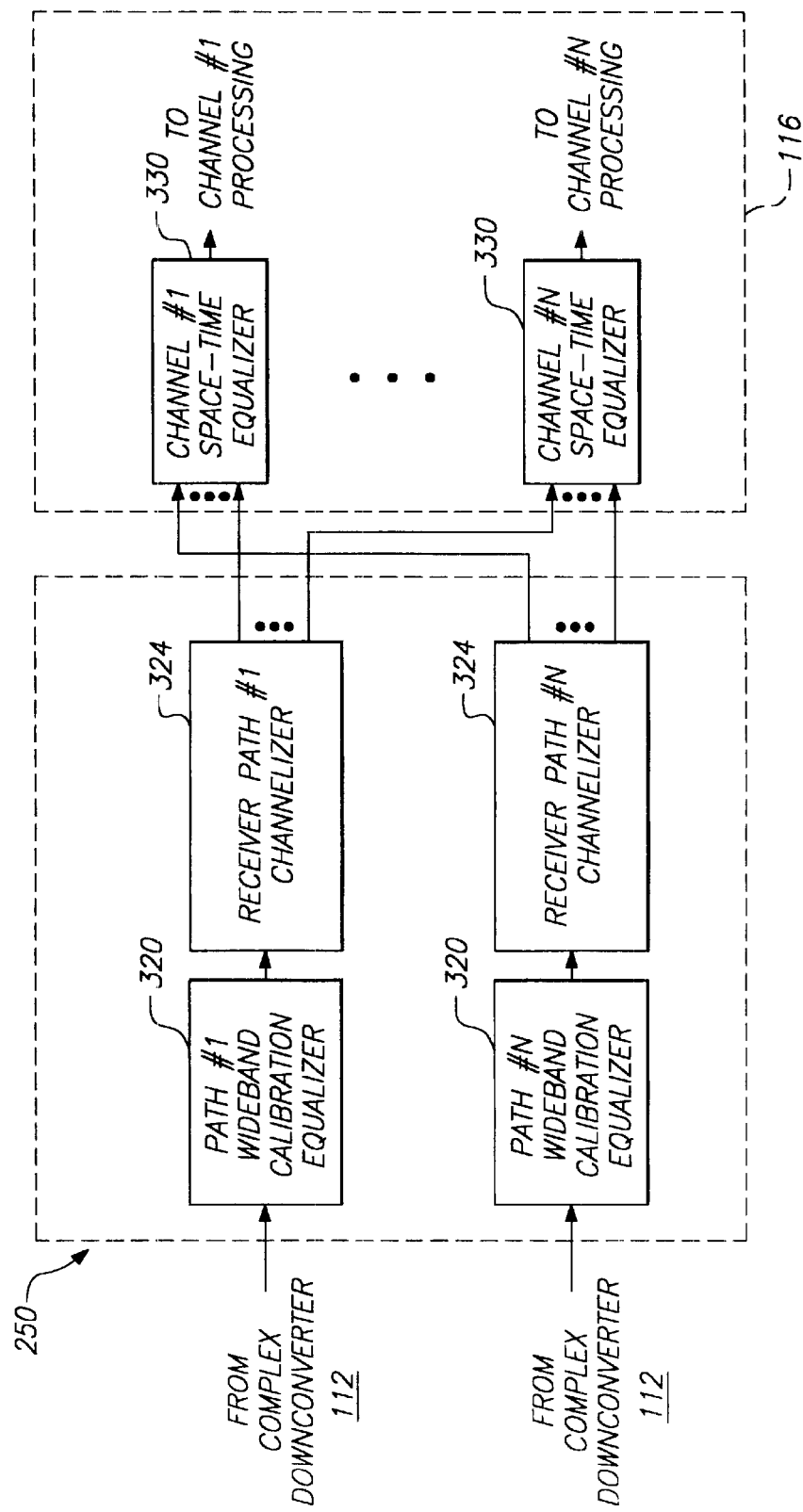
FIG. 9 is a block diagram of an implementation of a calibration equalizer and channelizer in which a single wideband calibration equalizer is coupled to each of the outputs of a complex downconverter within an RF receiver.

As mentioned above, both the calibration equalizer and channelizer 250 and the transmitter calibration equalizer & channel combiner may each include either: (i) a single wideband equalization filter, or (ii) a functionally equivalent set of narrowband equalization filters. Referring to FIG. 9, a block diagram is provided of an implementation of a calibration equalizer and channelizer 250 in which a single wideband calibration equalizer 320 is coupled to each of the M outputs of the complex downconverter 112 of the RF receiver 54. During operation of the adaptive beamforming network, the passband characteristics of each wideband calibration equalizer 320 are adjusted on the basis of the results of the previously described calibration procedures. As is indicated by FIG. 9, the equalized output of each of the M wideband calibration equalizers 320 is demultiplexed into a set of N independent frequency channels by channelizer 324. Within the receive channel weighting network 116 (FIG. 1), a set of N space-time equalizers 330 each receive the output produced by the channelizers 324 on a different one of the N frequency channels. Each space-time equalizer 330 is disposed to scale signal energy within its assigned frequency channel pursuant to the weighting vector provided the receiver weight vector adaptation network 118, the operation of which was described in sections I and II.

Figure 10:
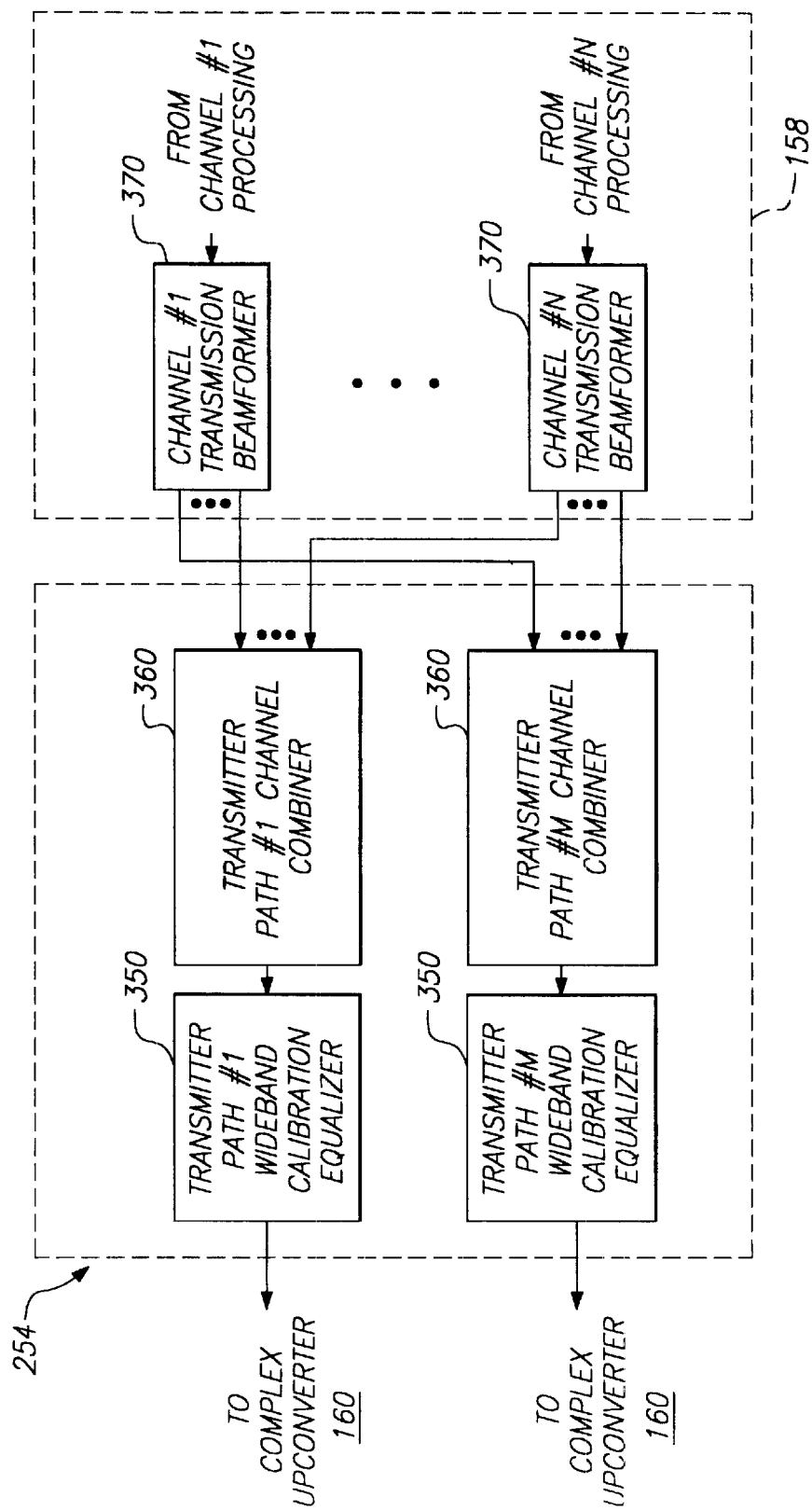
FIG. 10 depicts a block diagram of an implementation of a transmitter calibration equalizer & channel combiner in which a single transmit wideband calibration equalizer precedes each of the inputs to a complex upconverter.

In FIG. 10, a block diagram is provided of an implementation of a transmitter calibration equalizer & channel combiner 250 in which a single transmit wideband calibration equalizer 350 precedes each of the M inputs to the complex upconverter 160 of the RF transmitter 52. During operation of the adaptive beamforming network, the passband characteristics of each transmit wideband calibration equalizer 350 are adjusted on the basis of the results of the previously described calibration procedures. As is indicated by FIG. 10, the frequency-multiplexed input of each of the M wideband calibration equalizers 350 is provided one of a set of M channel combiners 360. Each of the M channel combiners 360 receives input on a different one of the N frequency channels from a set of N transmission beamformers 370 within the transmit channel weighting network 158 (FIG. 1). The scaling introduced by the N transmission beamformers 370 is predicated on the composition of the transmit beam weight vector generated by the transmitter weight vector adaptation network 150 (FIG. 1).

Figure 11:
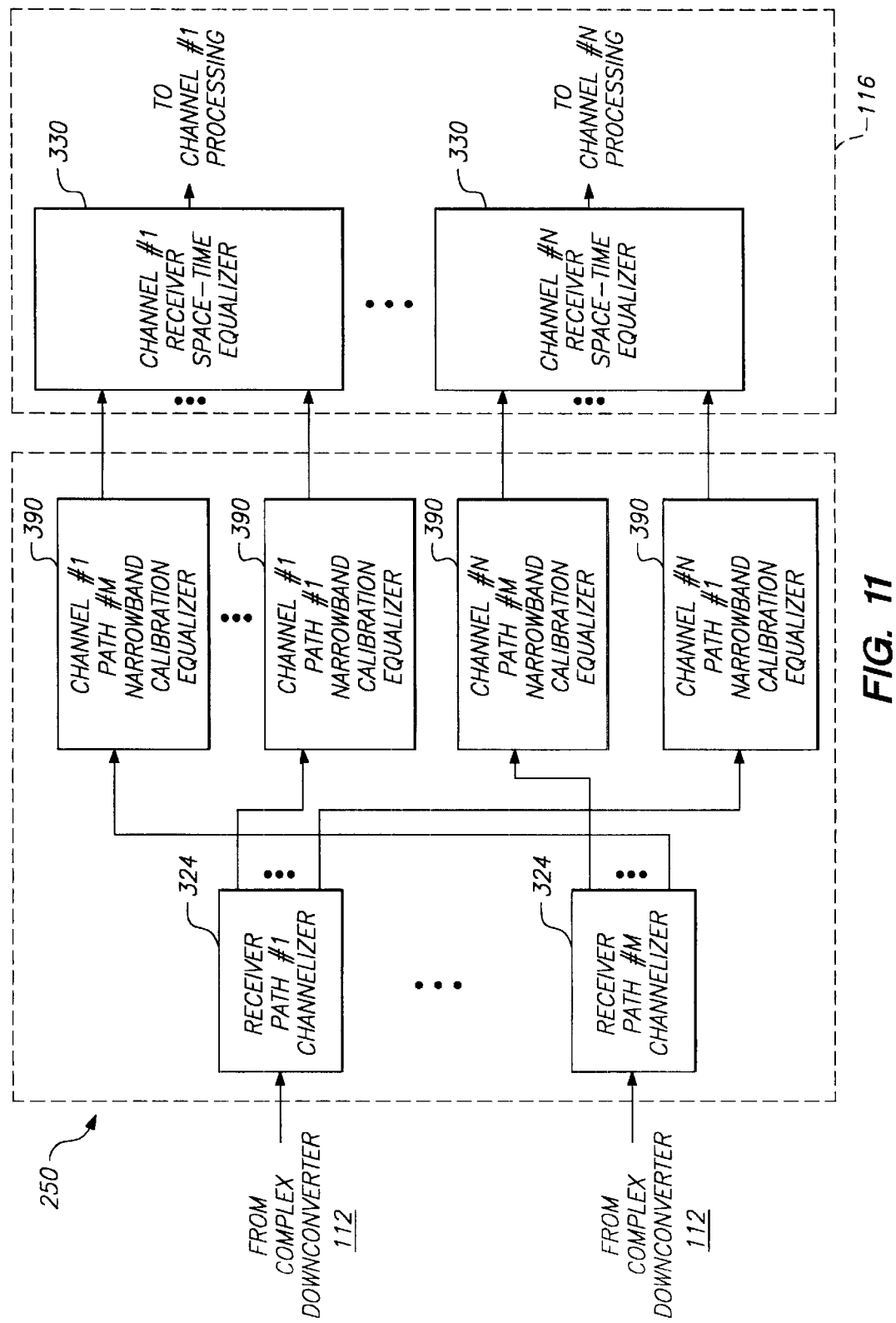
FIG. 11 is a block diagram of an implementation of a calibration equalizer and channelizer which utilizes a plurality of sets of narrowband calibration equalizers.

FIG. 11 is a block diagram of an implementation of the calibration equalizer and channelizer 250 which, although functionally equivalent to the structure of FIG. 9, utilizes M sets of N narrowband calibration equalizers 390 rather than M wideband equalizers. In addition, in the implementation of FIG. 11 the channelization operation is performed prior to equalization. Accordingly, each of the M channelizers 324 provides output on a different frequency channel to each of the N narrowband calibration equalizers 390 associated therewith.

Figure 12:
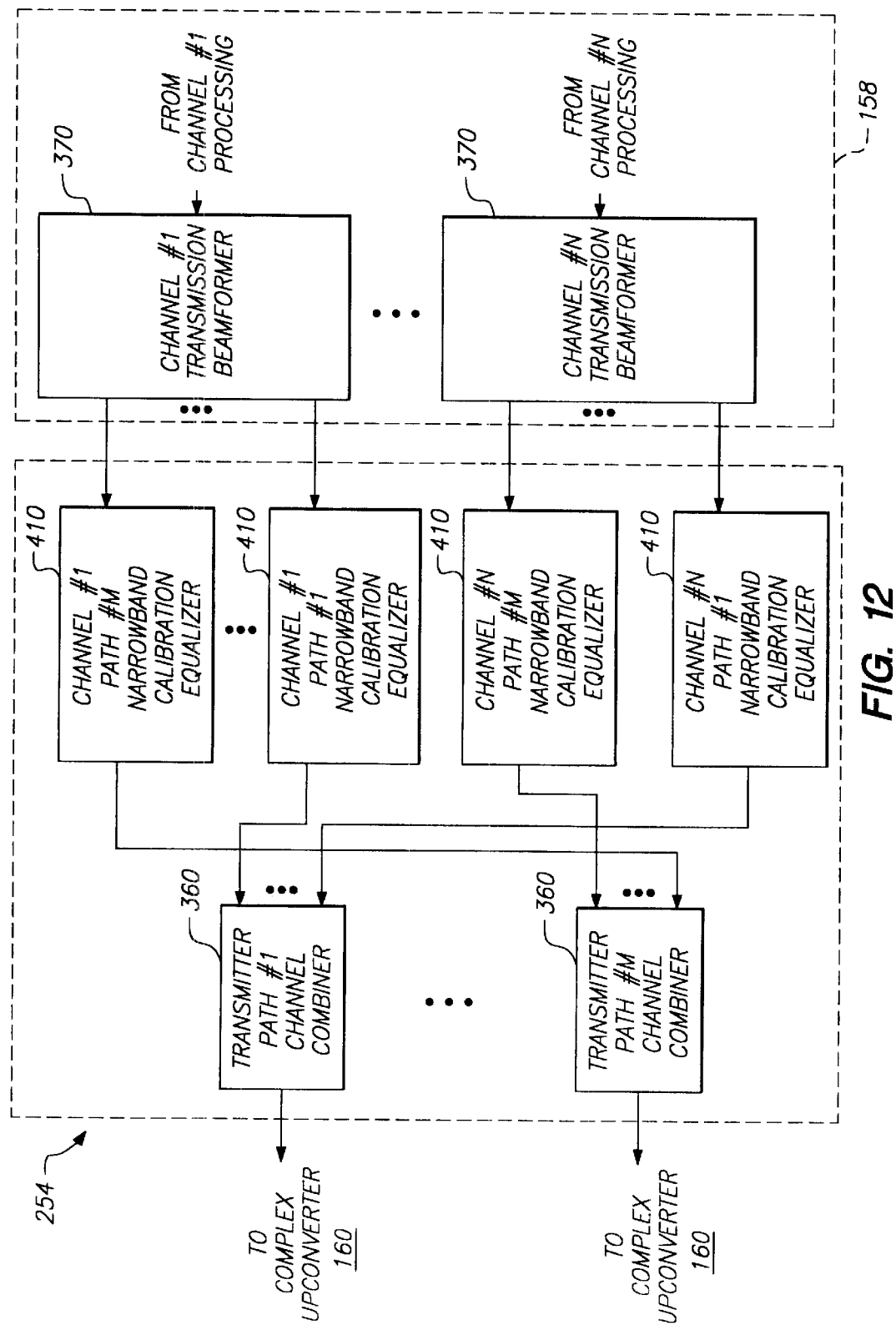
FIG. 12 depicts a transmitter calibration equalizer & channel combiner within which the equalization function is performed separately for each channel.

FIG. 12 depicts a transmitter calibration equalizer & channel combiner 250 functionally identical to that shown in FIG. 10, but within which the equalization function is performed separately for each channel prior to the frequency multiplexing operation. Specifically, a separate set of M narrowband calibration equalizers 410 are seen to be coupled to each transmission beamformer 370. In turn, the N calibration equalizers 410, coupled to a set of the M channel combiners 360, are each operative to produce an equalized signal on each of the N available frequency channels.

VI. Alternate Embodiments

Although the embodiments of the invention presented herein have been described in terms of optimization of the antenna pattern transmitted by a base station antenna array, the teachings of the invention are equally applicable to optimum formation of the mobile unit antenna pattern. That is, the mobile unit antenna pattern is formed such that a desired level of power is transmitted to the one or more base stations with which the mobile unit is in communication, and so that transmission power is minimized to the other base stations within the communication network. Again, an initial step in this antenna pattern optimization procedure involves statistically characterizing the mobile unit receive channel vector. The results of this statistical characterization are then used to determine the beam pattern weight vector which maximizes a predetermined quality parameter (e.g., signal to noise ratio) of the signal received by the intended base station(s), while minimizing signal transmission to other base stations. At the mobile station, the transmit antenna beam pattern is then generated in accordance with the transmit beam pattern weight vector.

Accordingly, in the following claims the term "central communications station" is intended to refer to either the base station or mobile unit configured to generate an optimized antenna beam pattern in accordance with the invention. When a base station comprises the central communications station, the mobile unit(s) in communication therewith are referred to as "remote communications station(s)". Conversely, when a mobile unit comprises the central communications station, the receiving base station(s) are identified as remote communications station(s).

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. In a communications system including a first communications station and a second communications station, said first communications station having a transmitter antenna array for generating an antenna beam pattern used for transmission of information signals to said second communications station, a method for adaptively forming said beam pattern comprising:
    estimating data transmitted from said second communications station to said first communications station based on signals received via multiple antennas of a receiver antenna array at said first communications station;
    developing a spatial statistical characterization of communication from said second communication station to said first communication station based on said estimated transmitted data and said signals received via said multiple antennas of said receiver antenna array;
    developing a beam pattern weight vector based on said statistical characterization; and
    forming said beam pattern in accordance with said beam pattern weight vector.

2. The method of claim 1 wherein said transmitter antenna array is the same array as said receiver antenna array.

3. The method of claim 1 wherein said receiver antenna array and said transmitter antenna array are different antenna arrays.

4. A central communication station for adaptively forming a transmission beam pattern to communicate with a remote communications station using a transmitter antenna array, comprising:
    a central processor;
    a receive processor coupled to said central processor and configured to:
        estimate data transmitted from said remote communications station to said central communications station based on signals received via multiple antennas of a receiver antenna array at said central communications station;
        develop a spatial statistical characterization of communication from said remote communication station to said central communication station based on said estimated transmitted data and said signals received via said multiple antennas of said receiver antenna array;
    a vector processor coupled to said central processor and configured to:
        develop a transmission beam pattern weight vector based on said spatial statistical characterization; and
        form said transmission beam pattern in accordance with said transmission beam pattern weight vector.

5. The central communication station of claim 4 wherein said transmitter antenna array is the same array as said receiver antenna array.

6. The central communication station of claim 4 wherein said receiver antenna array and said transmitter antenna array are different antenna arrays.

* * * * *